US008416810B2

(12) United States Patent
Yoshii et al.

(10) Patent No.: US 8,416,810 B2
(45) Date of Patent: Apr. 9, 2013

(54) RADIO COMMUNICATION BASE STATION APPARATUS AND PILOT TRANSMISSION METHOD

(75) Inventors: Isamu Yoshii, Kanagawa (JP); Akihiko Nishio, Kanagawa (JP); Masaru Fukuoka, Ishikawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/160,872

(22) PCT Filed: Jan. 18, 2007

(86) PCT No.: PCT/JP2007/050692
§ 371 (c)(1),
(2), (4) Date: Jul. 14, 2008

(87) PCT Pub. No.: WO2007/083701
PCT Pub. Date: Jul. 26, 2007

(65) Prior Publication Data
US 2010/0172286 A1    Jul. 8, 2010

(30) Foreign Application Priority Data

Jan. 19, 2006  (JP) .................................. 2006-011555
Mar. 23, 2006  (JP) .................................. 2006-080503

(51) Int. Cl.
*H04J 4/00*       (2006.01)
(52) U.S. Cl.
USPC .......................................... 370/478; 370/491
(58) Field of Classification Search ........................ None
See application file for complete search history.

(56) References Cited

U.S. PATENT DOCUMENTS

| 2005/0063339 | A1 | 3/2005 | Jeong | |
|---|---|---|---|---|
| 2006/0013338 | A1 | 1/2006 | Gore | |
| 2007/0211619 | A1* | 9/2007 | Jalloul et al. | 370/209 |
| 2009/0004971 | A1* | 1/2009 | Dateki et al. | 455/62 |

FOREIGN PATENT DOCUMENTS

| EP | 1 775 901 | 4/2007 |
|---|---|---|
| JP | 2006-311359 | 11/2006 |
| WO | 2005/011157 | 3/2005 |
| WO | 2006/011524 | 2/2006 |

OTHER PUBLICATIONS

NTT DoCoMo et al, "Physical Channels and Multiplexing in Evolved UTRA Downlink," 3GPP TSG RAN WG1 #42 on LTE, R1-050707, Aug. 2005, pp. 1-15.
NTT DoCoMo, "Physical Channel Structures for Evolved UTRA," 3GPP TSG RAN WG1 Meeting #41, R1-050464, May 2005, pp. 1-13.

(Continued)

*Primary Examiner* — Anh-Vu Ly
*Assistant Examiner* — Tito Pham
(74) *Attorney, Agent, or Firm* — Dickinson Wright PLLC

(57) ABSTRACT

Provided is a base station capable of giving a pilot appropriate for both of multicast data and unicast data which are frequency-multiplexed. In a pilot generation unit (105) of the base station, an insertion unit (1051) inserts a pilot (common pilot) common to a plurality of cells to generate an orthogonal pilot sequence (2). In accordance with the insertion process in the insertion unit (1051), an insertion unit (1052) inserts a sequence (common sequence) common to a plurality of cells to a unique scrambling sequence to generate a scrambling sequence. A scrambling unit (1053) performs a scrambling process for multiplying the orthogonal pilot sequence (2) by the scrambling sequence. This scrambling process generates, in a part of pilot sequences different for respective cells, a pilot sequence containing a pilot common to the cells.

12 Claims, 22 Drawing Sheets

OTHER PUBLICATIONS

NTT DoCoMo et al, "Pilot Channel Structure in Evolved UTRA Downlink," 3GPP TSG RAN WG1 #42 on LTE, R1-050705, Aug. 2005, pp. 1-15.

NTT DoCoMo et al, "Orthogonal Common Pilot Channel and Scrambling Code in Evolved UTRA Downlink," 3GPP TSG RAN WG1 #42 on LTE, R1-050704, Aug. 2005, pp. 1-8.

LG Electronics, "MBMS Transmission in E-UTRA," 3GPP TSG RAN WG1 #43, R1-051300, Nov. 2005, pp. 1-4.

Panasonic, "Inter-cell interference mitigation using orthogonal pilot among cells for downlink OFDM in EUTRA," TSG-RAN WG1 #42, R1-050826, Aug. 2005, 6 pages.

Panasonic, "Pilot channel multiplexing method for multi-antenna transmission in EUTRA OFDMA based downlink," TSG-RAN WG1 #42, R1-050828, Aug. 2005, 9 pages.

Panasonic, "Unicast/multicast multiplexing for downlink OFDM," TSG-RAN WG1 LTE Ad hoc meeting, R1-060158, Jan. 2006, 3 pages.

3GPP RAN WG1 LTE Adhoc meeting, R1-050589, "Pilot channel and scrambling code in evolved UTRA downlink," pp. 1-24.

3GPP RAN WG1 Meeting, #43, R1-051342, "Multiplexing of Broadcast and Unicast Traffic," Nov. 2005, pp. 1-5.

* cited by examiner

RADIO COMMUNICATION BASE STATION APPARATUS AND PILOT TRANSMISSION METHOD

TECHNICAL FIELD

The present invention relates to a radio communication base station apparatus and a pilot transmission method.

BACKGROUND ART

In recent years, in mobile communication, various information such as image and data as well as speech are subjected to transmission. With this trend, demands for high-reliability, high-speed transmission are increased. However, when high-speed transmission is performed in mobile communication, the influence of delayed waves by multipath is not negligible, and transmission performance degrades due to frequency selective fading.

Multicarrier communication such as OFDM (Orthogonal Frequency Division Multiplexing) is focused as one of counter techniques of frequency selective fading. Multicarrier communication is a technique of performing high speed transmission by transmitting data using a plurality of subcarriers of transmission rates suppressed to such an extent that frequency selective fading does not occur. Particularly, the OFDM scheme utilizes a plurality of subcarriers orthogonal to each other where data is arranged, provides high frequency efficiency in multicarrier communication, can be implemented with relatively simple hardware, is particularly focused and is variously studied. Therefore, the OFDM scheme has attracted attention as a communication method to be employed in cellular scheme mobile communication, and has been studied variously. Further, according to the OFDM scheme, to prevent intersymbol interference (ISI), the tail ends of OFDM symbols are attached to the heads of OFDM symbols as a CP (Cyclic Prefix). By this means, on the receiving side, it is possible to prevent ISI as long as the delay time of delay waves stays within the time length of CP (hereinafter "CP length").

On the other hand, recently, multicast communication has been studied. Multicast communication is not one-to-one communication such as unicast communication, but is one-to-many communication. That is, in multicast communication, one radio communication base station apparatus (hereinafter "base station") transmits the same data to a plurality of radio communication mobile station apparatuses (hereinafter "mobile stations") at the same time. By this multicast communication, in mobile communication systems, for example, distribution services of music data and video image data and broadcast services such as television broadcast are realized. Further, services using multicast communication are assumed to be services for relatively wide communication areas that cannot be covered by one base station, and, consequently, multicast communication entirely covers wide communication areas by transmitting the same data from a plurality of base stations. By this means, data for multicast communication (multicast data) is transmitted through a multicast channel shared by a plurality of base stations. That is, multicast data is the same between a plurality of cells. Thus, in the multicast channel, the same data is transmitted from a plurality of base stations at the same time, and, consequently, a mobile station nearby the cell boundary receives mixed multicast data comprised of multiple multicast data from a plurality of base stations.

Here, if the OFDM scheme is employed in multicast communication and there is a mobile station located nearby the cell boundary, if a plurality of the same OFDM symbols transmitted at the same time from a plurality of base stations with a shorter time lag than the CP length, these OFDM symbols are combined and received in a state their received power is amplified. To correct the channel fluctuation (phase fluctuation and amplitude fluctuation) of the combined signals by channel estimation, channel estimation values for these combined signals are necessary. Therefore, in multicast communication using the OFDM scheme, for the pilot used to calculate channel estimation values, the same pilot needs to be transmitted from a plurality of base stations at the same time, as in the case of multicast data. That is, the pilot for multicast data needs to be common between a plurality of cells.

On the other hand, in the unicast channel, a plurality of base stations transmit respective data (unicast data) (see Non-Patent Document 1). That is, unicast data differs between multiple cells. By this means, for the pilot used to calculate channel estimation values in unicast communication, different pilots need to be transmitted from a plurality of base stations as in the case of unicast data. That is, unicast data pilots need to be different between multiple cells.

Further, studies are underway to frequency-domain-multiplex multicast data and unicast data using the OFDM scheme (see Non-Patent Document 2). The description in this document employs broadcast instead of multicast. While multicast communication employs a mode of communication in which information is transmitted only to specific mobile stations subscribing services such as news groups, broadcast communication employs a mode of communication in which information is transmitted to all mobile stations as in today's television broadcast and radio broadcast. Further, a combination of multicast and broadcast is sometimes referred to as "MBMS (Multimedia Broadcast/Multicast Services channel."

Non-Patent Document 1: 3GPP RAN WG1 LTE Adhoc meeting (2005.06) R1-050589 "Pilot channel and scrambling code in evolved UTRA downlink"

Non-Patent Document 2: 3GPP RAN WG1 Meeting #43 Seoul, Korea, 7-11 Nov., 2005, R1-051342, "Multiplexing of Broadcast and Unicast Traffic"

DISCLOSURE OF INVENTION

Problems to be Solved by the Invention

Here, multicast data pilots are common between a plurality of cells as above, and, consequently, the channel estimation value per cell cannot be calculated using these pilots. Therefore, when multicast data and unicast data are frequency-domain-multiplexed using the OFDM scheme as above, channel estimation values for multicast data and unicast data may be calculated using the unicast data pilots. For example, after channel estimation values of a plurality of cells are calculated using unicast data pilots, the channel estimation value for multicast data is calculated by combining all of these channel estimation values.

However, if the channel estimation value for multicast data is calculated as above, this channel estimation value is likely to include interference components between cells due to the fact that the unicast data pilots vary between cells. Therefore, if the channel fluctuation of multicast data is corrected using the channel estimation value calculated as above, compared to the case where the channel fluctuation of multicast data is corrected using a channel estimation value calculated from the pilot for multicast data, the accuracy of channel estimation decreases and the error rate performances degrade.

It is therefore an object of the present invention to provide, where unicast data and multicast data are frequency-domain-multiplexed, a base station and a pilot transmission method for providing pilots suitable for both data.

Means for Solving the Problem

The base station of the present invention that transmits a multicarrier signal where first data (unicast data) that differs between a plurality of cells and second data (multicast data) that is the same between the plurality of cells are frequency-domain-multiplexed, employs a configuration having: a generating section that generates a first pilot sequence that differs between the plurality of cells and that includes a second pilot that is common between the plurality of cells in part of the first pilot sequence; and a multiplexing section that time-domain-multiplexes the first pilot sequence and the multicarrier signal.

ADVANTAGEOUS EFFECT OF THE INVENTION

According to the present invention, part of the first pilot sequence for the first data (unicast data) can be used as a second pilot sequence for second data (multicast data), so that it is possible to provide pilots that are suitable for the first data (unicast data) and the second data (multicast data).

BEST MODE FOR CARRYING OUT THE INVENTION

Embodiments of the present invention will be explained below in detail with reference to the accompanying drawings. Here, in the following explanation, although the OFDM scheme is explained as an example of a multicarrier communication scheme, the present invention is not limited to the OFDM scheme.

(Embodiment 1)

The base station according to the present invention is used in a radio communication system using the OFDM scheme and transmits an OFDM symbol in which unicast data and multicast data are frequency-domain-multiplexed.

Figure 1:
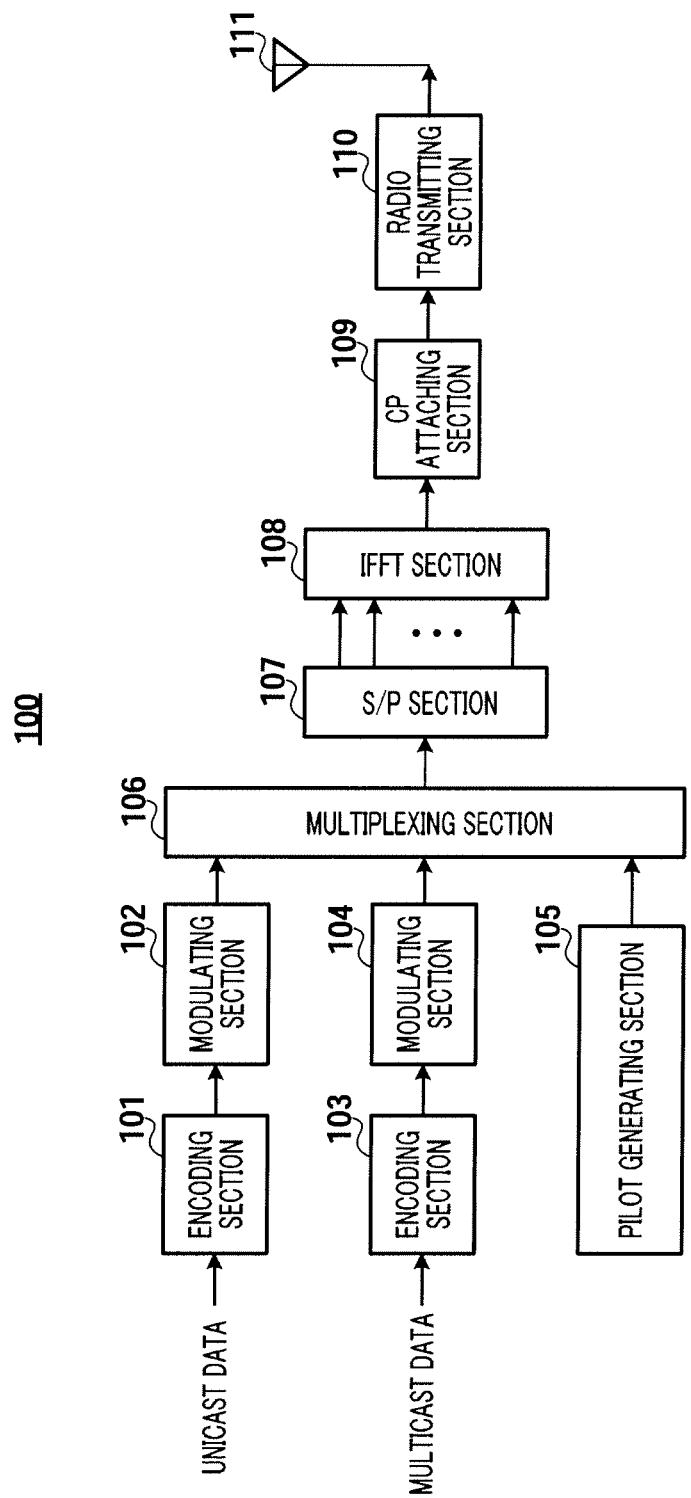
FIG. 1 is a block diagram showing a configuration of a base station according to Embodiment 1 of the present invention.

FIG. 1 illustrates the configuration of base station 100 according to the present embodiment.

Encoding section 101 encodes unicast data and outputs the encoded unicast data to modulating section 102.

Modulating section 102 generates unicast data symbols by modulating the encoded unicast data and outputs the symbols to multiplexing section 106.

Encoding section 103 encodes multicast data and outputs the encoded multicast data to modulating section 104.

Modulating section 104 generates multicast data symbols by modulating the encoded multicast data and outputs the symbols to multiplexing section 106.

Pilot generating section 105 generates a pilot sequence that differ between a plurality of cells and that includes pilots a pilot that is common between the plurality of cells in part of the pilot sequences, and outputs the generated pilot sequences to multiplexing section 106. Pilot sequence generation will be described later.

Figure 2:
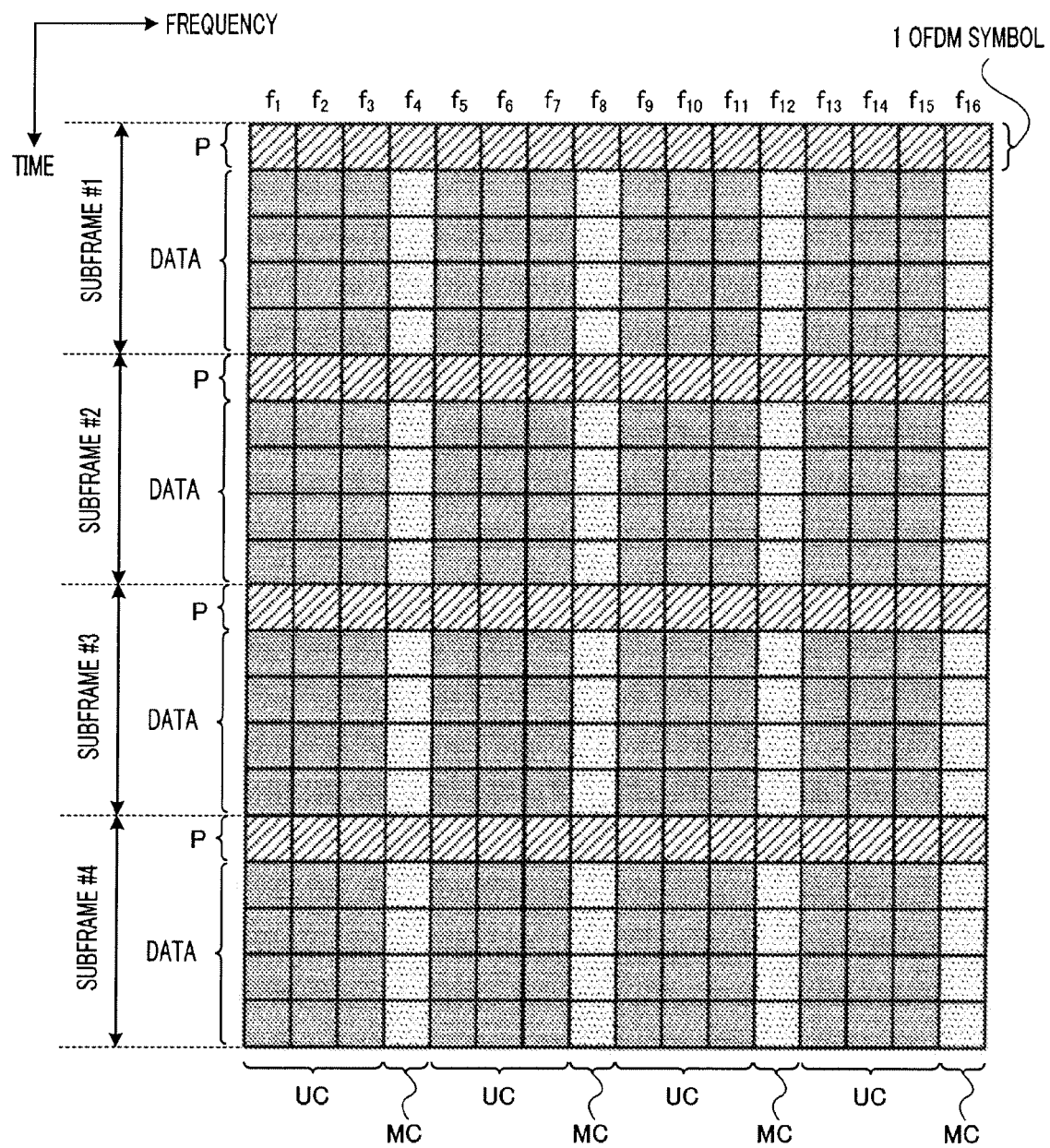
FIG. 2 illustrates an example of a frame configuration according to Embodiment 1 of the present invention.

Multiplexing section 106 time-domain-multiplexes pilot sequences (P), unicast data symbols (UC) and multicast data symbols (MC), according to the frame structure shown in FIG. 2, and outputs the result to S/P section 107. This time-domain-multiplexing is performed on a per subframe basis as shown in FIG. 2, and the pilot sequences (P) are time-domain-multiplexed over the head of each subframe.

Here, assume that a frame is comprised of 20 subframes #1 to #20. FIG. 2 illustrates only subframes #1 to #4. In other subframes, pilot sequences (P) are time-domain-multiplexed in the same way as above. Further, an example will be explained where an OFDM symbol is comprised of sixteen subcarriers $f_1$ to $f_{16}$.

S/P section 107 converts in parallel the pilot sequences, unicast data symbols and multicast data symbols, which are inputted in order and in series from multiplexing section 106, in units of the number of subcarriers included in one OFDM symbol, and outputs the result to IFFT (Inverse Fast Fourier Transform) section 108. By this means, the pilot sequence, unicast data symbols and multicast data symbols are assigned to the subcarriers forming an OFDM symbol. In this case, as shown in, for example, FIG. 2, S/P section 107 assigns unicast data symbols (UC) to subcarriers $f_1$ to $f_3$, $f_5$ to $f_7$, $f_9$ to $f_{11}$ and $f_{13}$ to $f_{15}$, and assigns multicast data to subcarriers $f_4$, $f_8$ $f_{12}$ and $f_{16}$. By this means, unicast data symbols and multicast data symbols are frequency-domain-multiplexed.

IFFT section 108 performs an IFFT for a plurality of subcarriers to which the pilot sequence, unicast data symbols and multicast data symbols are assigned and converts these into time domain signals, thereby generating OFDM symbols, which are multicarrier signals. These OFDM symbols are outputted to CP attaching section 109. As shown in FIG. 2, IFFT section 108 generates OFDM symbols comprised of pilot sequences (P) and OFDM symbols where unicast data symbols (UC) and multicast data symbols (MC) are frequency-domain-multiplexed, and these OFDM symbols are time-domain-multiplexed by the processing in multiplexing section 106.

CP attaching section 109 attaches the same signal as the tail end of an OFDM symbol to the head of that OFDM symbol as a CP.

Radio transmitting section 110 performs transmitting processing such as D/A conversion, amplification and up-conversion on the OFDM symbol with a CP, and transmits the result from antenna 111 to a mobile station.

Next, pilot sequence generation in pilot generating section 105 will be explained in detail.

Figure 3:
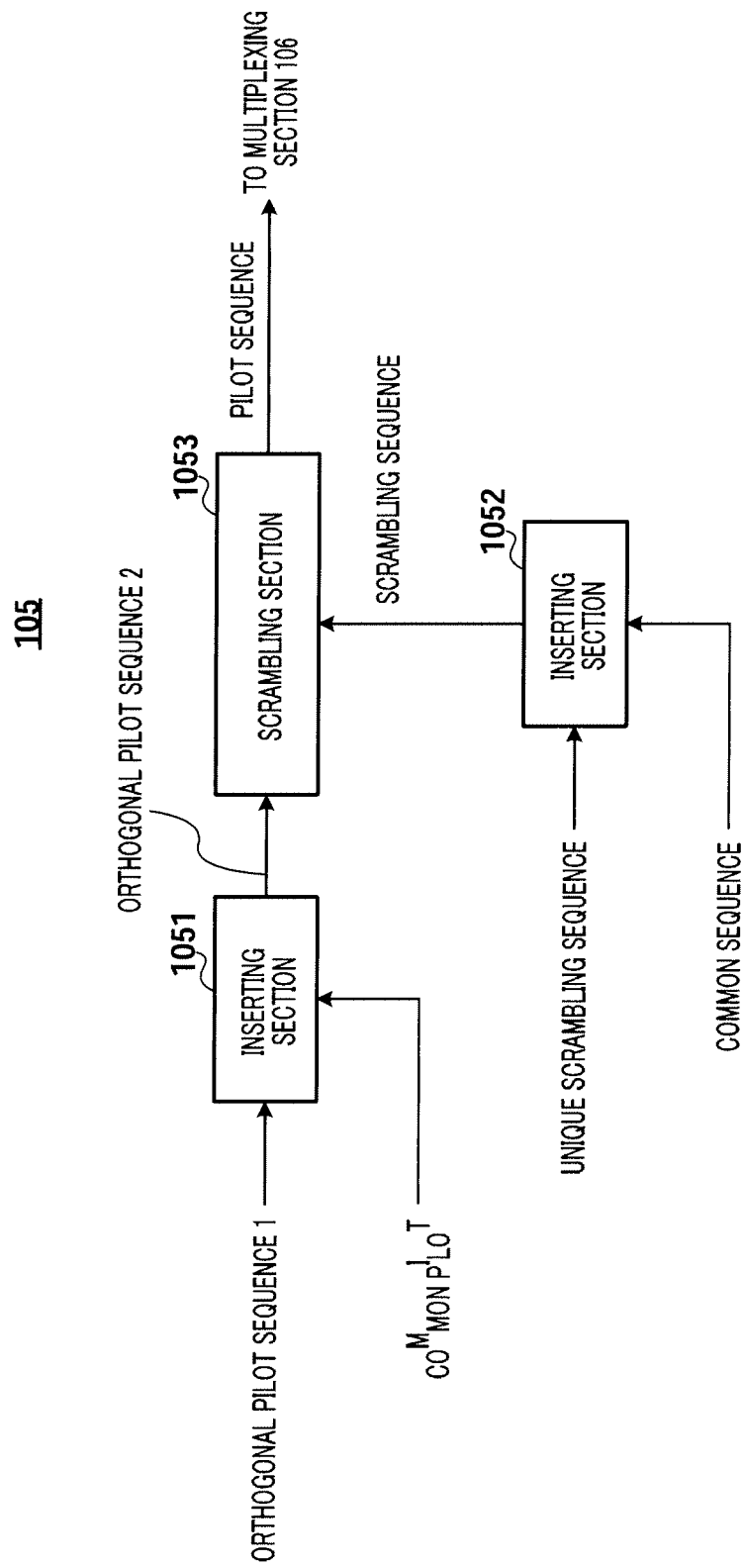
FIG. 3 is a block diagram showing a configuration of a pilot generating section according to Embodiment 1 of the present invention.

FIG. 3 illustrates the configuration of pilot generation section 105.

Figure 4:
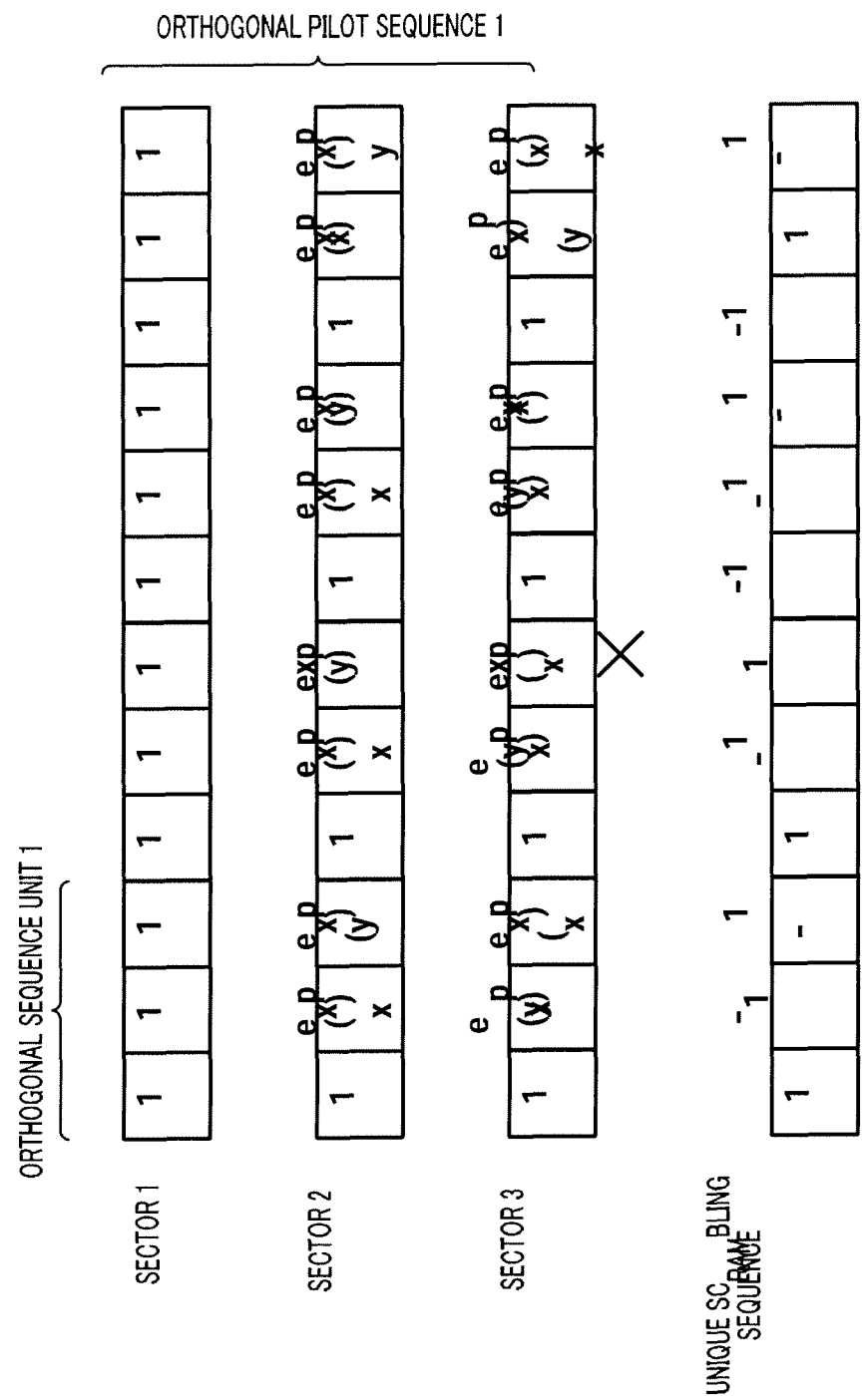
FIG. 4 illustrates orthogonal pilot sequence 1 and a unique scrambling sequence according to Embodiment 1 of the present invention.

Orthogonal pilot sequences 1 shown in FIG. 4 are inputted to inserting section 1051.

Here, if one cell is divided into a plurality of sectors, there are cases where orthogonal pilot sequences 1 differ on a per sector basis are set to reduce interference between sectors. For example, if one cell is comprised of sectors 1 to 3, and, as shown in FIG. 4, a sequence comprised of straight 1's is set for sector 1, a spread sequence of the sector 1 sequence may be set for sector 2 by multiplying a sequence comprised of 1, exp(x), exp(y) . . . , over the sector 1 sequence, and a spread sequence of the sector 1 sequence may be set for sector 3 by multiplying a sequence comprised of 1, exp (y), exp(x) . . . , over the sector 1 sequence. In FIG. 4, x is $j(2\pi/3)$ and y is $-j(2\pi/3)$. As a result, exp(x) is $-0.5000+0.8660i$ and exp(y) is $-0.5000-0.8660i$. Therefore, as shown in FIG. 4, orthogonal pilot sequences 1 of sectors 1 to 3 are orthogonal to each other by a unit of three chips comprised of combinations of "1," "exp(x)" and "exp (y)." Here, each orthogonal pilot sequence 1 is comprised of a plurality of same orthogonal sequence units. For example, the orthogonal pilot sequence 1 of sector 1 repeats the orthogonal frequency unit "1, 1, 1," the orthogonal pilot sequence 1 of sector 2 repeats the orthogonal frequency unit "1, exp(x), exp(y)," and the orthogonal pilot sequence 1 of sector 3 repeats the orthogonal frequency unit "1, exp(y), exp(x)." Further, the orthogonal pilot sequence 1 set in each sector is common between cells. Therefore, as shown in FIG. 4, orthogonal pilot sequences 1 are multiplied by scrambling sequences that differ between cells and that are unique to base stations (unique scrambling sequence). With this multiplication, orthogonal pilot sequences 1 are set the pilot sequences unique to base stations.

Figure 5:
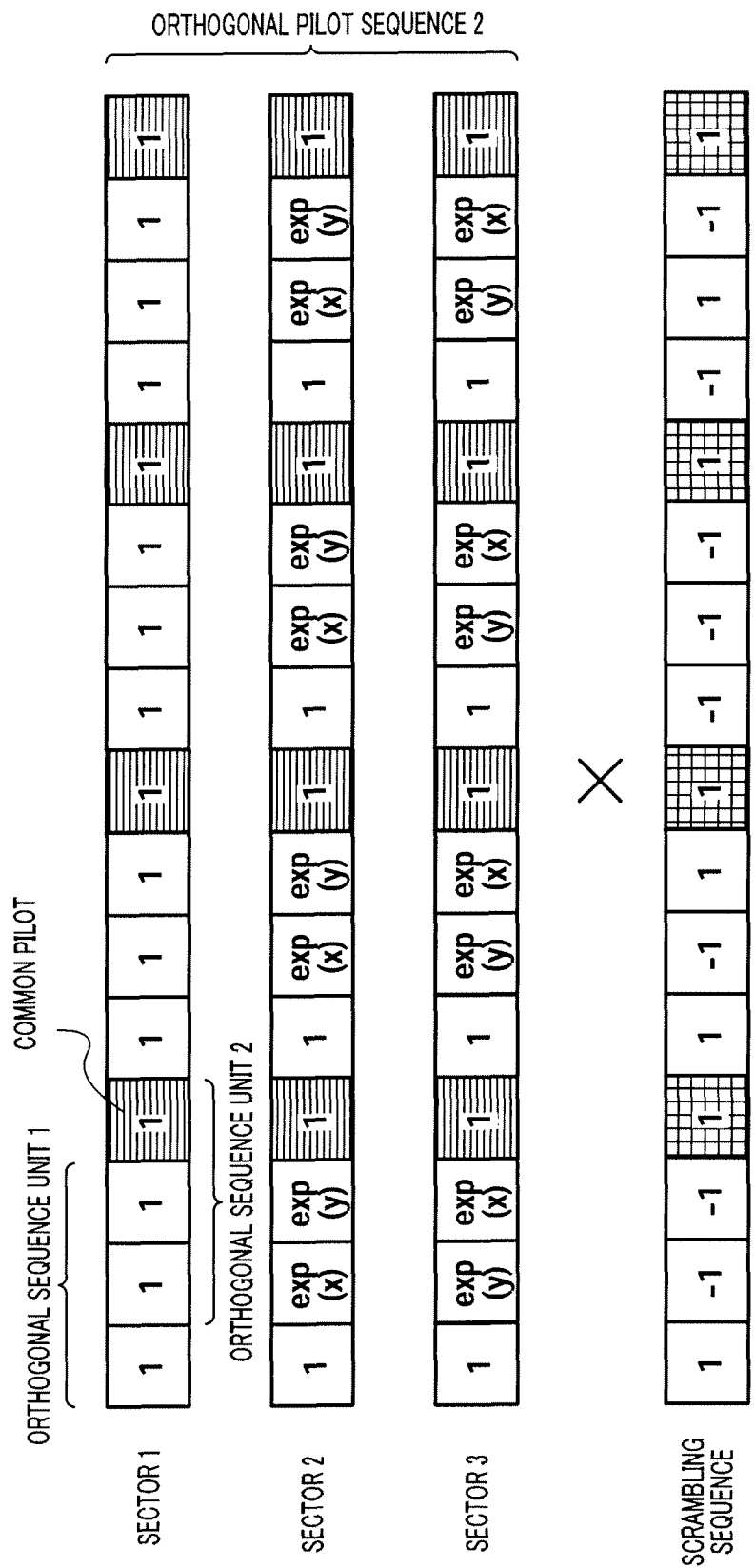
FIG. 5 illustrates orthogonal pilot sequence 2 and a scrambling sequence according to Embodiment 1 of the present invention.

As shown in FIG. 5, inserting section 1051 generates orthogonal pilot sequences 2 by inserting pilots that are common between a plurality of cells (common pilots) into orthogonal pilot sequences 1. To be more specific, inserting section 1051 generates orthogonal pilot sequence 2 by inserting common pilots into each of a plurality of orthogonal pilot sequence units forming orthogonal pilot sequence 1. With this insertion processing, it is possible to generate orthogonal pilots 2 including orthogonal pilot sequences that differ between a plurality of sectors and pilots that are common between a plurality of cells. Here, the common pilot "1" is inserted. Further, the common pilot is inserted at four-chip intervals, from the fourth chip onward. After the common pilots are inserted, as shown in FIG. 5, orthogonal pilot sequences 2, comprised of three-chip units if combinations of "1," "exp(x)" and "exp(y)," as orthogonal sequence unit 1 and orthogonal sequence 2, are orthogonal to each other between sectors 1 to 3. Orthogonal pilot sequences 2 generated as above are inputted to scrambling section 1053.

On the other hand, as shown in FIG. 5, inserting section 1052 generates a scrambling sequence by inserting the sequence "1, 1, 1, 1" that is common between a plurality of cells (common sequence), into the unique scrambling sequence shown in FIG. 4, according to the insertion processing in inserting section 1051. With this insertion processing, it is possible to generate the scrambling sequence including a unique scrambling sequence that differs between a plurality of cells and a sequence that is common between a plurality of cells. The scrambling sequence generated as above is inputted to scrambling section 1053.

As shown in FIG. 5 scrambling section 1053 performs scrambling processing of multiplying orthogonal pilot sequences 2 by the scrambling sequence. With this scrambling processing, as shown in FIG. 6, for each section 1 to 3, it is possible to generate a pilot sequence that differs between a plurality of cells and that includes common pilots between a plurality of cells in part of the pilot sequence.

Figure 6:
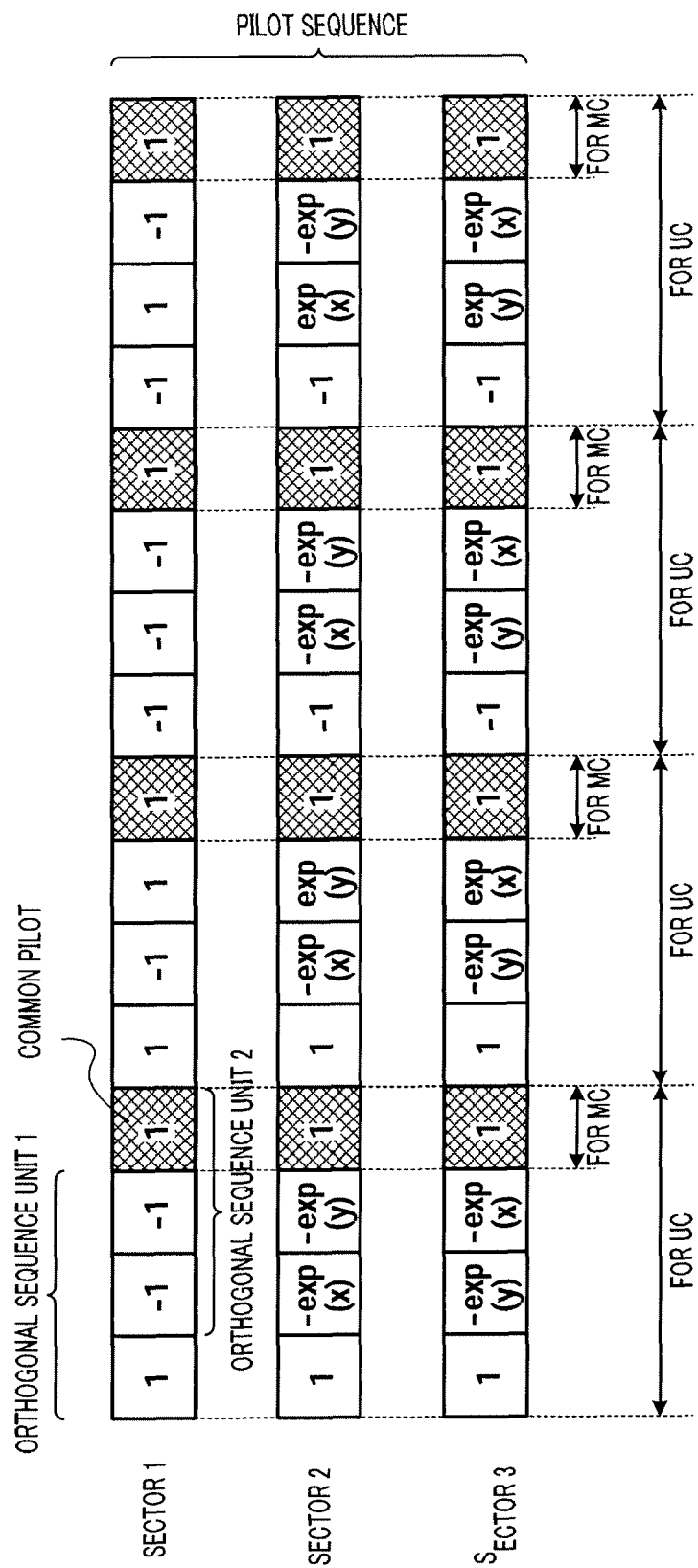
FIG. 6 illustrates a pilot sequence according to Embodiment 1 of the present invention.

In the pilot sequences shown in FIG. 6, both orthogonal sequence unit 1 and orthogonal sequence unit 2 are orthogonal to each other between cells in addition to between sectors, so that it is possible to use each of these units as one unit and use these units as unicast data (UC) pilots. On the other hand, in the pilot sequences shown in FIG. 6, the common pilots are common between cells in addition to between sectors, so that it is possible to use the common pilots as the multicast data pilots (MC). Thus, the pilot sequences shown in FIG. 6 include multicast data pilots in part of the pilot sequences for unicast data. To be more specific, the pilot sequences include the multicast data pilots arranged at regular intervals in the pilot sequences for unicast data. Therefore, a mobile station that receives these pilot sequences can use part of the pilot sequences for unicast data as multicast data pilots.

Here, to increase channel estimation accuracy in the mobile station, as shown in FIGS. 2 and 6, out of subcarriers $f_1$ to $f_{16}$ forming an OFDM symbol, pilot generating section 105 maps the multicast data pilots (common pilot) on subcarriers of the same frequencies as subcarriers $f_4$, $f_a$, $f_{12}$, $f_{16}$ on which multicast data symbols are mapped.

Thus, pilot generating section 105 generates pilot sequences applicable to unicast data and multicast data.

Figure 7:
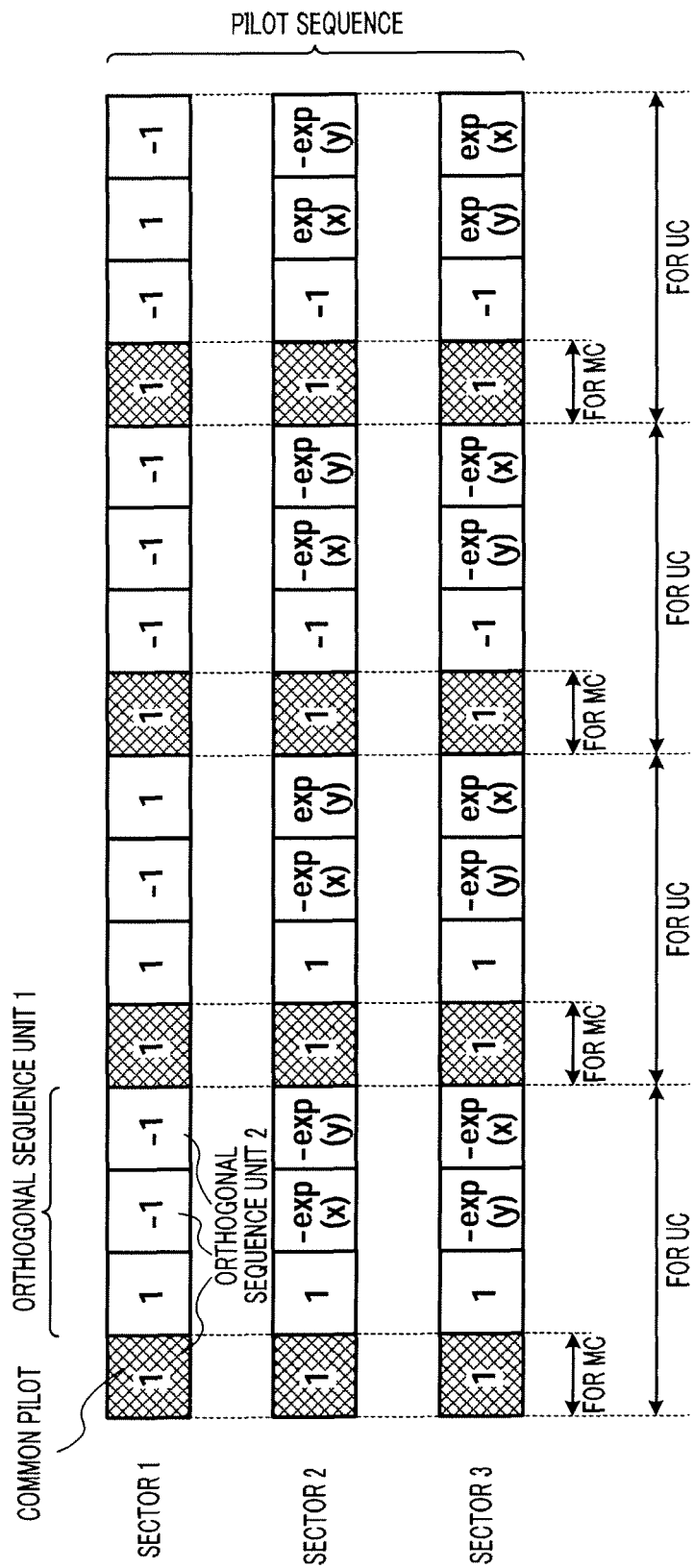
FIG. 7 illustrates a pilot sequence according to Embodiment 1 of the present invention (variation 1)
Figure 8:
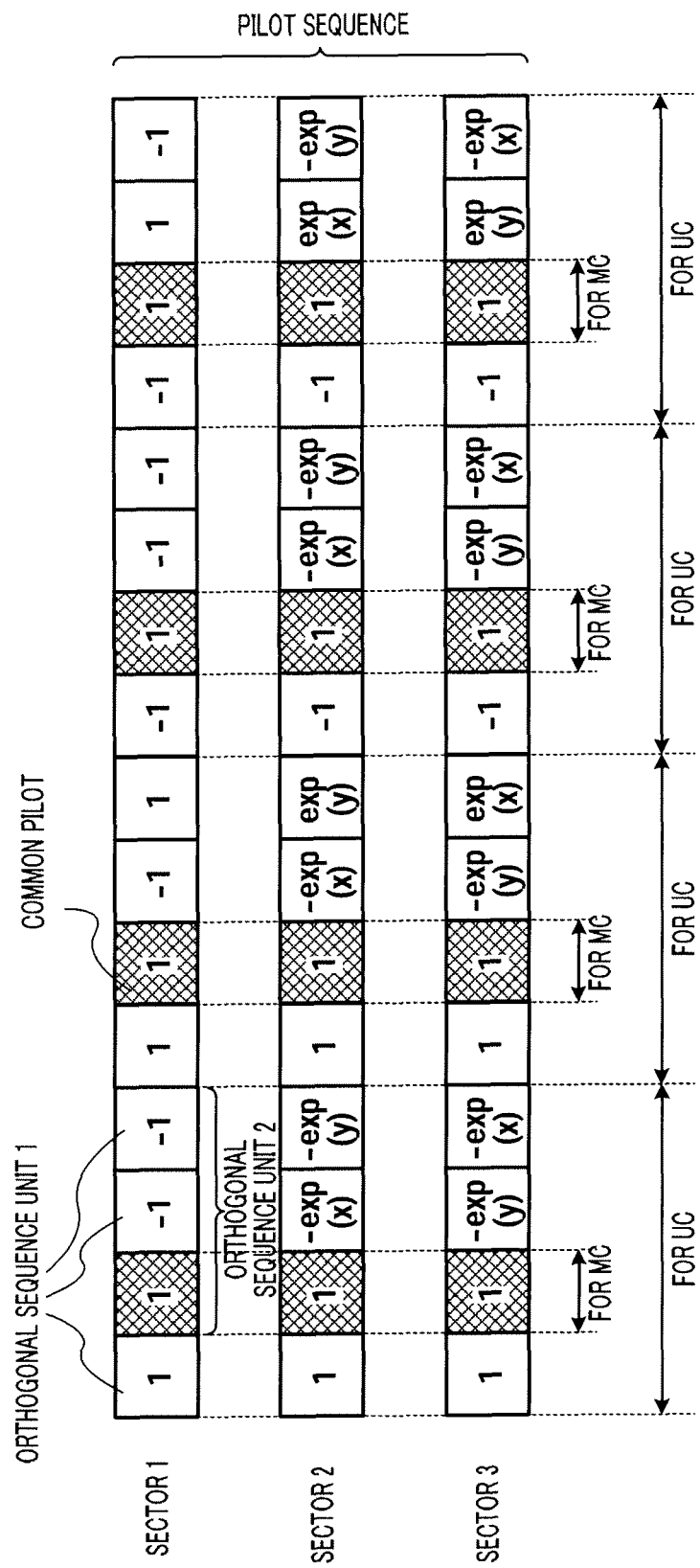
FIG. 8 illustrates a pilot sequence according to Embodiment 1 of the present invention (variation 2)
Figure 9:
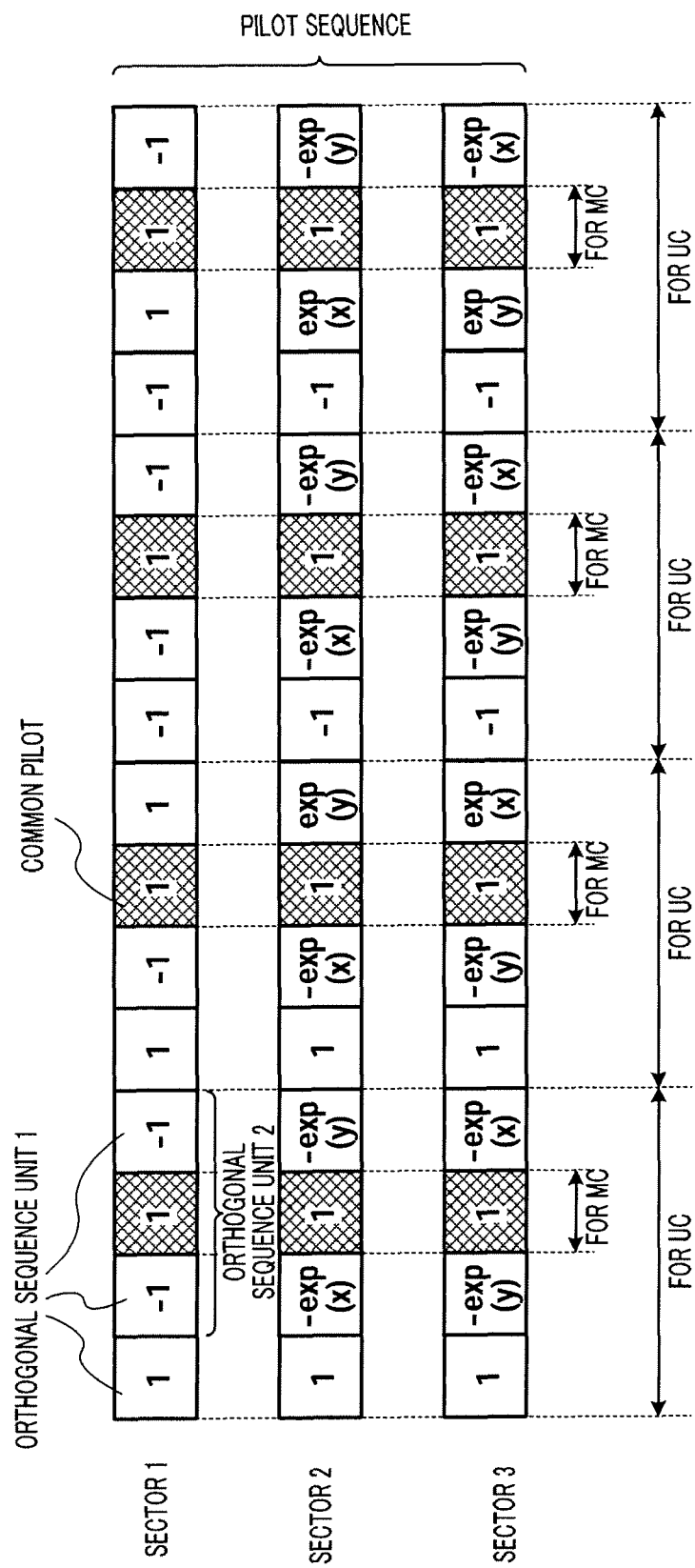
FIG. 9 illustrates a pilot sequence according to Embodiment 1 of the present invention (variation 3)

Here, when the subcarriers on which multicast data symbols are mapped are subcarriers $f_1$, $f_5$, $f_9$, $f_{13}$, according to the mapping, pilot generating section 105 maps the multicast data pilots on subcarriers of the same frequencies as subcarriers $f_1$, $f_5$, $f_9$, $f_{13}$, as shown in FIG. 7. Further, when the subcarriers on which multicast data symbols are mapped are subcarriers $f_2$, $f_6$, $f_{10}$, $f_{14}$, according to the mapping, pilot generating section 105 maps the multicast data pilots on subcarriers of the same frequency as subcarriers $f_2$, $f_6$, $f_{10}$, $f_{14}$, as shown in FIG. 8. Further, when subcarriers on which multicast data symbols are mapped are subcarriers $f_3$, $f_7$ $f_n$, according to the mapping, pilot generating section 105 maps the multicast data pilots on subcarriers of the same frequency as subcarriers $f_3$, $f_7$, $f_{11}$, $f_{15}$, as shown in FIG. 9. In FIGS. 7 to 9, as in FIG. 6, both orthogonal sequence unit 1 and orthogonal sequence unit 2 are orthogonal to each other between cells in addition to between sectors, so that it is possible to use each of these units as one unit and use these units as unicast data pilots (UC). Further, in FIGS. 7 to 9, as in FIG. 6, the common pilots are common between cells in addition to between sectors, so that it is possible to use the common pilots as the multicast data pilots (MC). Therefore, as in FIG. 6, the pilot sequences shown in FIGS. 7 to 9 include the multicast data pilots in part of the pilot sequences for unicast data, so that a mobile station can use part of the pilot sequences for unicast data as the multicast data pilots. Thus, pilot generating section 105 can map the common pilots on certain positions in orthogonal sequence units according to the positions where multicast data symbols are mapped in the frequency domain.

Here, although a case has been described with the above explanation where pilot generating section 105 generates a pilot sequence by multiplying orthogonal pilot sequence 2, which is generated by inserting common pilots into orthogonal pilot sequence 1, by a scrambling sequence generated by inserting a common sequence into a unique scrambling sequence, it is also possible to generate the pilot sequences shown in FIGS. 6 to 9 by inserting common pilots on a per orthogonal sequence unit basis, into a sequence generated by multiplying orthogonal sequence 1 by a unique scrambling sequence.

Further, although the common pilot is "1" in the above explanation, the common pilot may be the other values when the value is common between a plurality of cells.

Pilot sequence generation in pilot generating section 105 has been explained in detail above.

Next, a mobile station, which receives the OFDM symbol comprised of pilot sequences and generated as above and the OFDM symbol generated as above where unicast data symbols and multicast data symbols are frequency-domain-multiplexed, will be explained.

Figure 10:
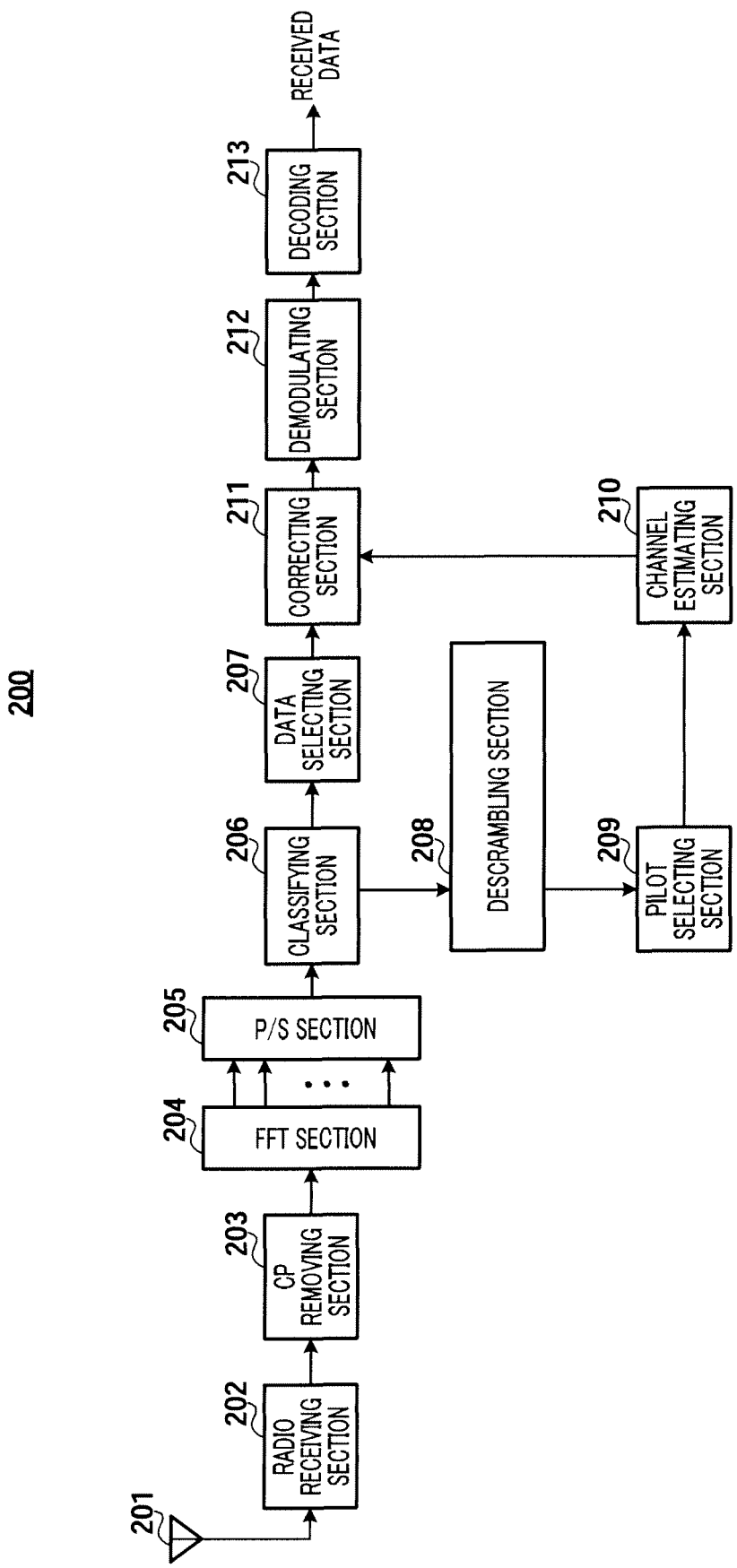
FIG. 10 is a block diagram showing a configuration of a mobile station (for receiving multicast data) according to Embodiment 1 of the present invention.

First, FIG. 10 shows the configuration of mobile station 200 for receiving multicast data.

Radio receiving section 202 receives an OFDM symbol transmitted from base station 100 (FIG. 1) via antenna 201, performs reception processing such as down-conversion and A/D conversion on the received OFDM symbol and outputs the result to CP removing section 203.

CP removing section 203 removes the CP attached to the OFDM symbol and outputs the OFDM symbol without the CP to FFT (Fast Fourier Transform) section 204.

FFT section 204 converts the OFDM symbol inputted from CP removing section 203 into frequency domain signals by the IFFT, acquires pilot sequences, unicast data symbols and multicast data symbols, and outputs these in units of the number of the subcarriers to P/S section 205 in parallel.

P/S section 205 converts the pilot sequences, unicast data symbols and multicast data symbols inputted in parallel from FFT section 204 into serial data and outputs the serial data to classifying section 206.

Classifying section 206 classifies the pilot sequences from the data symbols, and outputs the pilot sequences to descrambling section 208 and outputs the unicast data symbols and the multicast data symbols to data selecting section 209.

Descrambling section 208 performs descrambling processing of multiplying the pilot sequences by scrambling sequences. Descrambling section 208 acquires orthogonal pilot sequences 2 by this descrambling processing and outputs these to pilot selecting section 209.

Pilot selecting section 209 selects common pilots from orthogonal pilot sequences 2 and outputs the common pilots to channel estimating section 210.

Channel estimating section 210 calculates a channel estimation value using the common pilots selected in pilot selecting section 209 and outputs the channel estimation value to correcting section 211.

Out of unicast data symbols and multicast data symbols, data selecting section 207 selects multicast data symbols and outputs the multicast data symbols to correcting section 211.

Correcting section 211 corrects the channel fluctuation of the multicast data symbols using the channel estimation value calculated in channel estimating section 210 and outputs the result to demodulating section 212. Here, correcting section 211 corrects the channel fluctuation of the multicast data symbols by multiplying the multicast data symbols by the complex conjugate of the channel estimation value.

Demodulating section 212 demodulates the multicast data symbols inputted from correcting section 211 and outputs the result to decoding section 213.

Decoding section 213 decodes the demodulated multicast data symbols. By this means, multicast data is acquired as received data.

Figure 11:
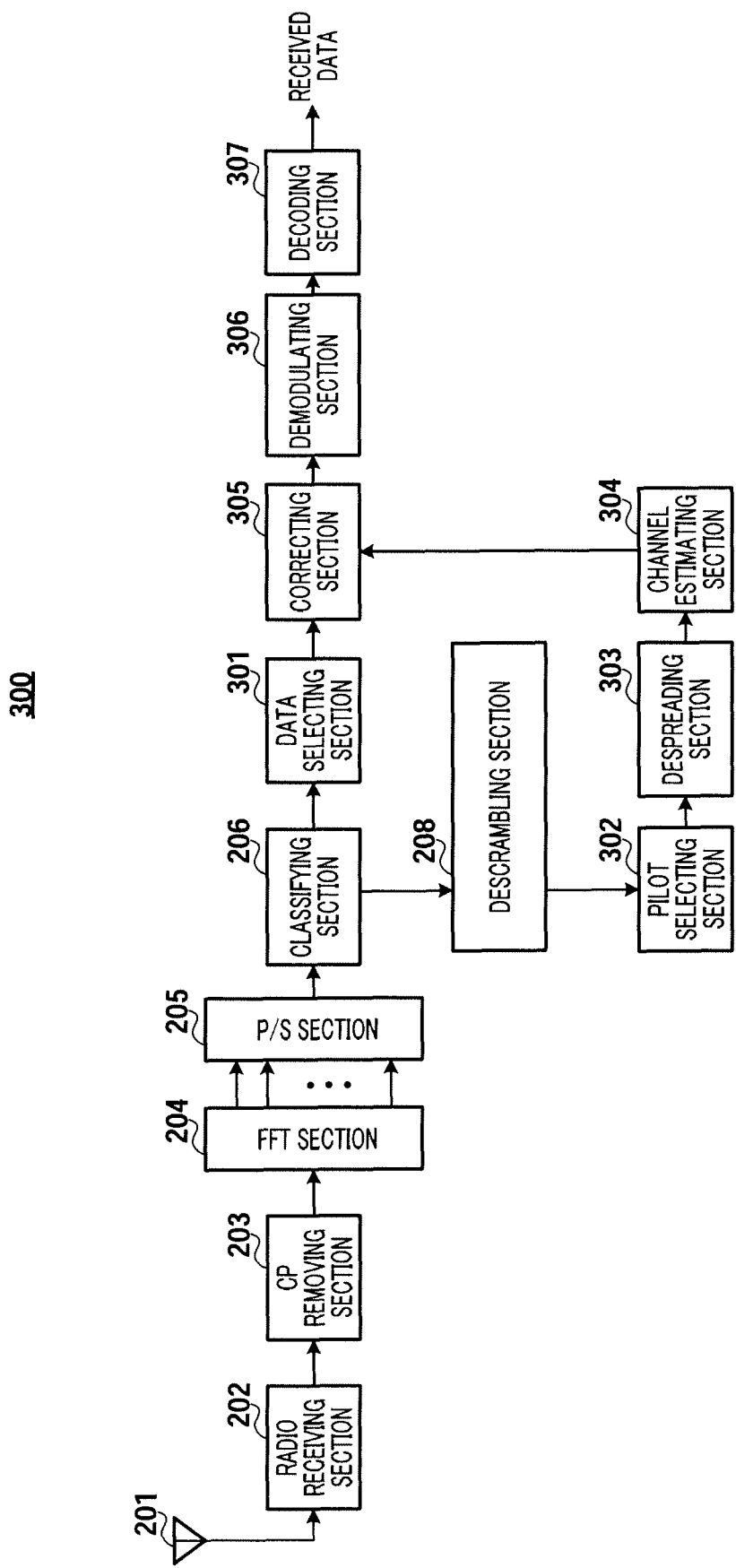
FIG. 11 is a block diagram showing a configuration of a mobile station (for receiving unicast data) according to Embodiment 1 of the present invention.

Next, FIG. 11 shows the configuration of mobile station 300 for receiving unicast data. Here, in FIG. 11, the same components as in FIG. 10 will be assigned the same reference numerals and explanations thereof will be omitted.

Out of the unicast data symbols and the multicast data symbols, data selecting section 301 selects unicast data symbols and outputs the unicast data symbols to correcting section 305.

Orthogonal pilot sequences 2 acquired by descrambling processing in descrambling section 208 are inputted to pilot selecting section 302.

Pilot selecting section 302 selects orthogonal sequence units 1 not including common pilots from orthogonal pilot sequences 2 and outputs these orthogonal sequence units 1 to despreading section 303.

Despreading section 303 despreads orthogonal sequence units 1 and outputs the despread values acquired by this despreading, that is, outputs the pilots of orthogonal pilot sequence 1 to channel estimating section 304.

Channel estimating section 304 calculates a channel estimation value using the pilots of orthogonal pilot sequence 1 and outputs the channel estimation value to correcting section 305.

Correcting section 305 corrects channel fluctuation of the unicast data symbols using the channel estimation value calculated in channel estimating section 304 and outputs the result to demodulating section 306. Here, correcting section 305 corrects the channel fluctuation of the unicast data symbols by multiplying the unicast data symbols by the complex conjugate of the channel estimation value.

Demodulating section 305 demodulates the unicast data symbols inputted from correcting section 305 and outputs the result to decoding section 307.

Decoding section 307 decodes the demodulated unicast data symbols. By this means, unicast data is acquired as received data.

Figure 12:
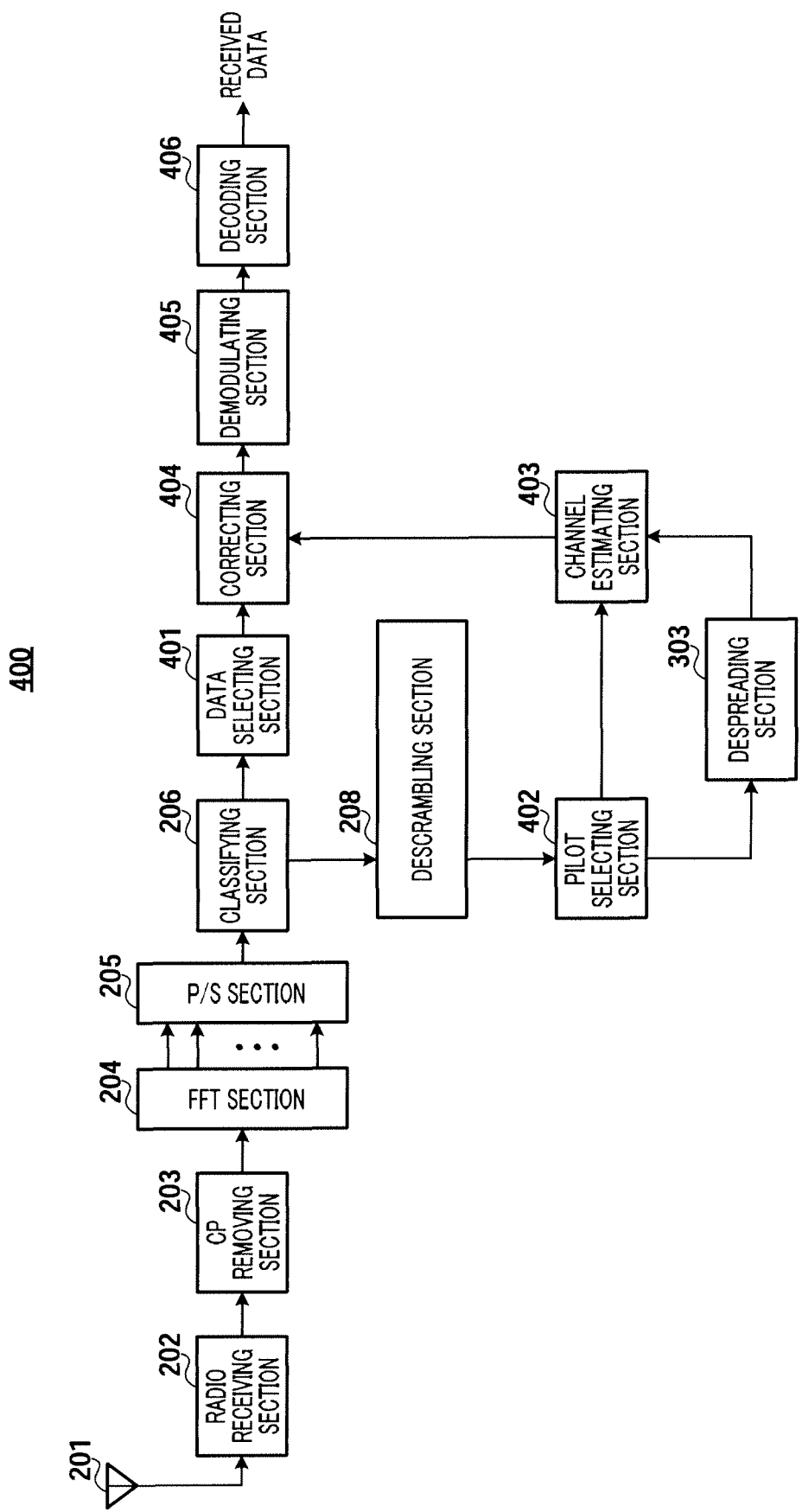
FIG. 12 is a block diagram showing a configuration of a mobile station (for receiving multicast data and unicast data) according to Embodiment 1 of the present invention.

Next, FIG. 12 shows the configuration of mobile station 400 that can be used for receiving multicast data and unicast data. Here, in FIG. 12, the same components as in FIGS. 10 and 11 will be assigned the same reference numerals and explanations thereof will be omitted.

When mobile station 400 is used for receiving multicast data, data selecting section 401 selects the multicast data symbols from the unicast data symbols and the multicast data symbols, and outputs the multicast data symbols to correcting section 404. By contrast, when mobile station 400 is used for receiving unicast data, data selecting section 401 selects the unicast data symbols from the unicast data symbols and the multicast data symbols, and outputs the unicast data symbols to correcting section 404.

Orthogonal pilot sequence 2 acquired by the descrambling processing in descrambling section 208 is inputted to pilot selecting section 402.

Pilot selecting section 402 selects the pilots matching the type of data subjected to channel estimation, from the pilot sequence. When the multicast data symbols are outputted from data selecting section 401 to correcting section 404, pilot selecting section 402 selects the common pilots from orthogonal pilot sequence 2 and outputs the common pilots to channel estimating section 403. By contrast, when the unicast data symbols are outputted from data selecting section 401 to correcting section 404, pilot selecting section 402 selects orthogonal sequence units 1 not including the common pilots from orthogonal pilot sequence 2 and outputs these orthogonal sequence units 1 to despreading section 303.

When orthogonal sequence units 1 are inputted from pilot selecting section 402, despreading section 303 despreads these orthogonal sequence units 1 and outputs the despreading values acquired by this despreading, that is, outputs the pilots of orthogonal pilot sequence 1 to channel estimating section 403.

Channel estimating section 403 calculates the channel estimation value using the common pilots or the pilots of orthogonal pilot sequence 1, and outputs the channel estimation value to correcting section 404.

Correcting section 404 corrects the channel fluctuation of the multicast data symbols or unicast data symbols using the estimation value calculated in channel estimating section 403, and outputs the result to demodulating section 405.

Demodulating section 405 demodulates the multicast data symbols or unicast data symbols inputted from correcting section 404 and outputs the result to decoding section 406.

Decoding section 406 decodes the demodulated multicast data symbols or unicast data symbols. By this means, one of multicast data and unicast data is acquired as received data.

As described above, according to the present invention, when multicast data and unicast data are frequency-domain-multiplexed, pilot sequences suitable for both unicast data and multicast data can be provided, so that it is possible to maintain channel estimation accuracy for unicast data and prevent deterioration of channel estimation accuracy for multicast data.

(Embodiment 2)

Figure 13:
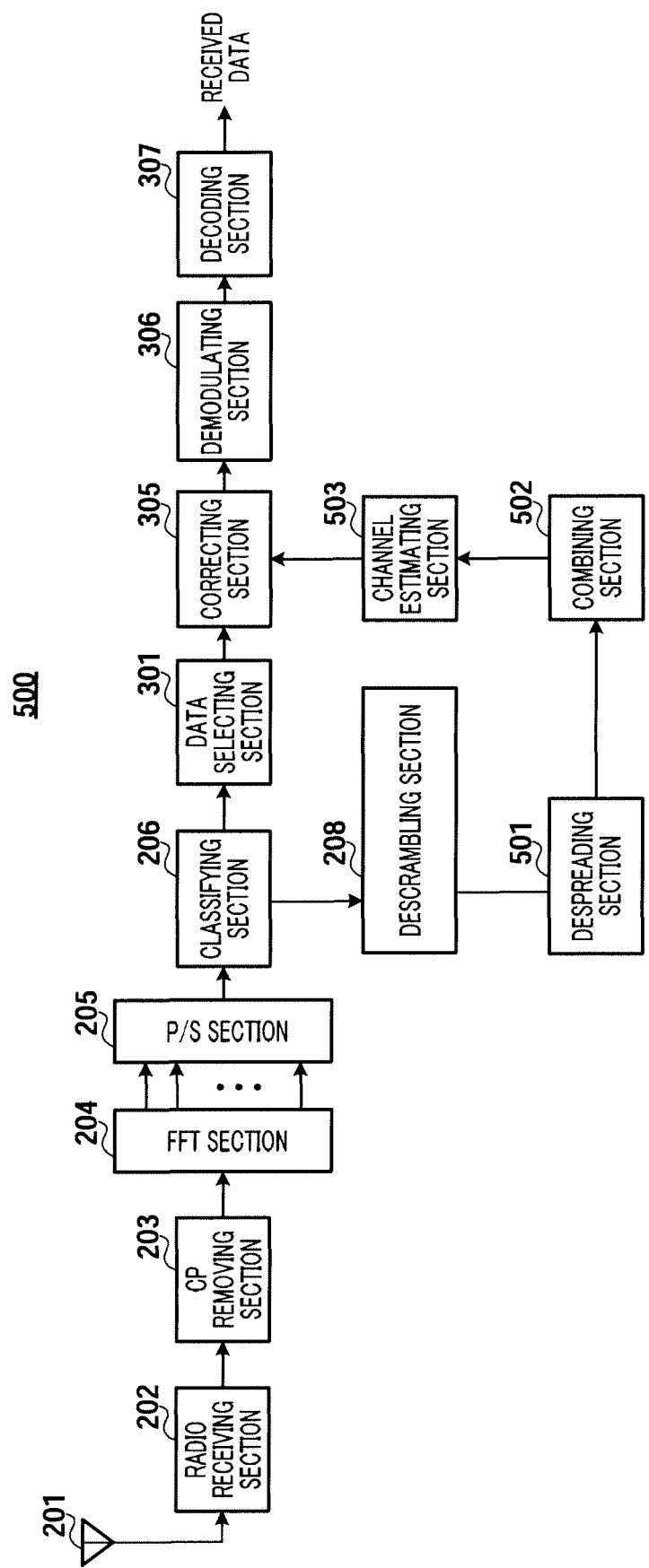
FIG. 13 is a block diagram showing a configuration of a mobile station (for receiving unicast data) according to Embodiment 2 of the present invention.

FIG. 13 shows the configuration of mobile station 500 for receiving unicast data according to the present embodiment. Here, in FIG. 13, the same components as in FIG. 10 or FIG. 11 will be assigned the same reference numerals and explanations thereof will be omitted.

Orthogonal pilot sequence 2 acquired by the descrambling processing in descrambling section 208 is inputted to despreading section 501.

Here, as described above, in the pilot sequences shown in FIG. 6, both orthogonal sequence unit 1 and orthogonal sequence unit 2 are orthogonal to each other between cells in addition to between sectors, so that it is possible to use each of these units as one unit and use these units as the unicast data pilots (UC).

Therefore, out of orthogonal pilot sequence 2, despreading section 501 despreads orthogonal sequence units 1 not including common pilots and orthogonal sequence units 2 including the common pilots, and outputs despreading values acquired by this despreading to combining section 502.

Figure 14:
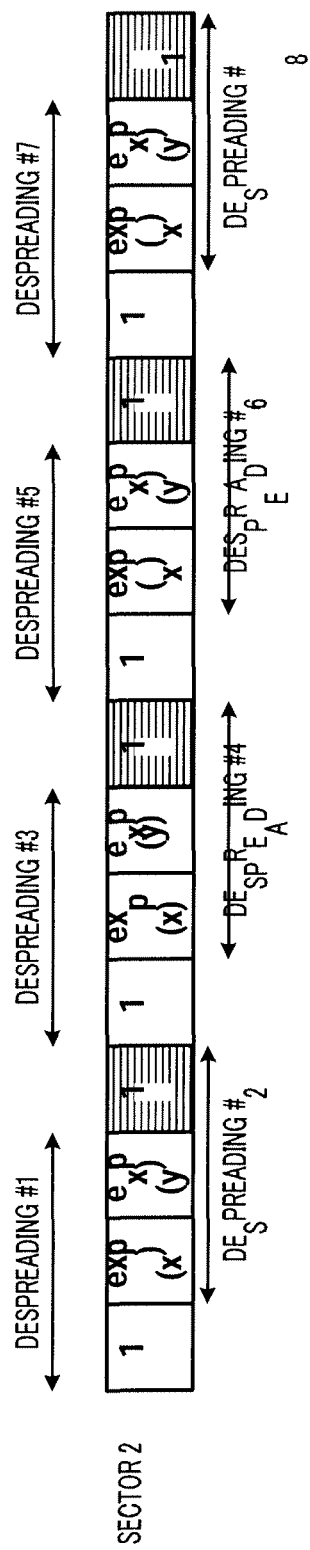
FIG. 14 illustrates an example of despreading according to Embodiment 2 of the present invention.

For example, when mobile station 500 is located in sector 2 and base station 100 (FIG. 1) transmits the pilot sequences shown in FIG. 6, despreading section 501 performs despreading in the steps #1 to #8 shown in FIG. 14. That is, despreading section 501 performs despreading #1 for orthogonal sequence unit 1 "1, exp(x), exp(y)" not including the common pilot, and performs despreading #2 for orthogonal sequence unit 2 "exp(x), exp(y), 1" including the common pilot. Despreading #3 to #8 are performed in the same way as above.

Figure 15:
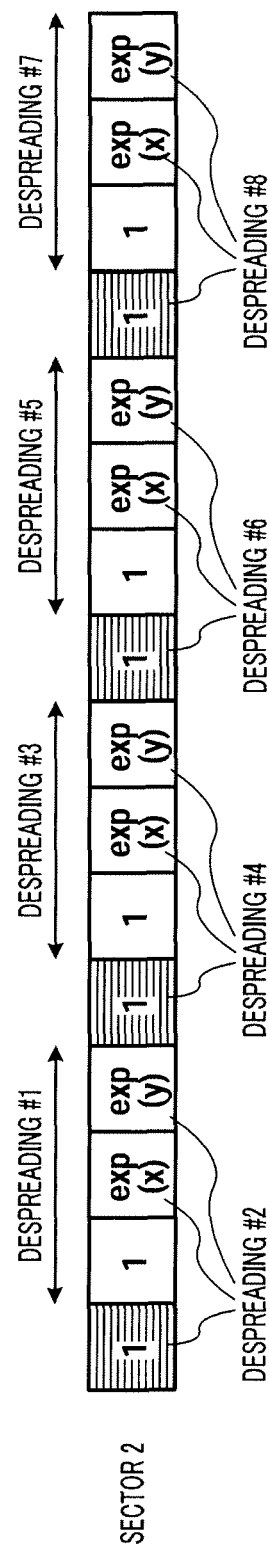
FIG. 15 illustrates an example of despreading according to Embodiment 2 of the present invention (variation 1)

Further, for example, when mobile station 500 is located in sector 2 and base station 100 (FIG. 1) transmits the pilot sequences shown in FIG. 7, as shown in FIG. 15, despreading section 501 performs despreading #1 for orthogonal sequence unit 1 "1, exp(x), exp(y)" not including the common pilot, and performs despreading #2 for orthogonal sequence unit 2 "1, exp(x), exp(y)" including the common pilot. Despreading #3 to #8 are performed is the same way as above.

Figure 16:
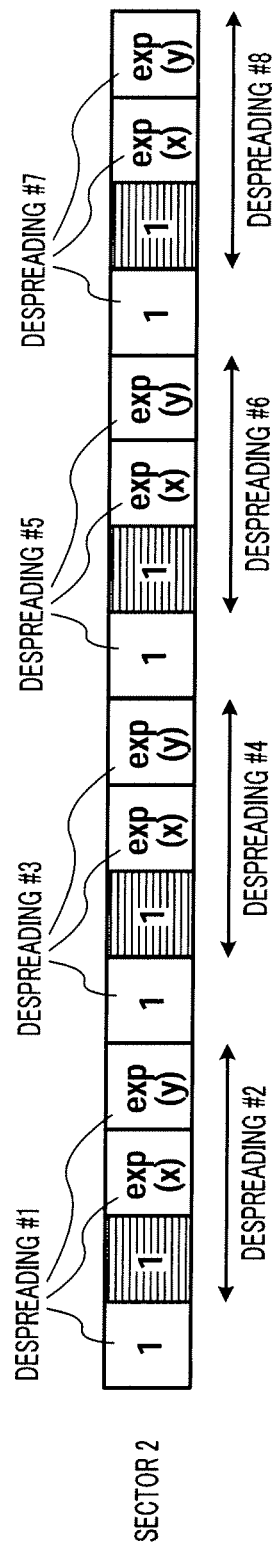
FIG. 16 illustrates an example of despreading according to Embodiment 2 of the present invention (variation 2)

Further, for example, when mobile station 500 is located in sector 2 and base station 100 (FIG. 1) transmits the pilot sequences shown in FIG. 8, as shown in FIG. 16, despreading section 501 performs despreading #1 for orthogonal sequence unit 1 "1, exp(x), exp(y)" not including the common pilot, and performs despreading #2 for orthogonal sequence unit 2 "1, exp(x), exp(y)" including the common pilot. Despreading #3 to #8 are performed in the same way as above.

Figure 17:
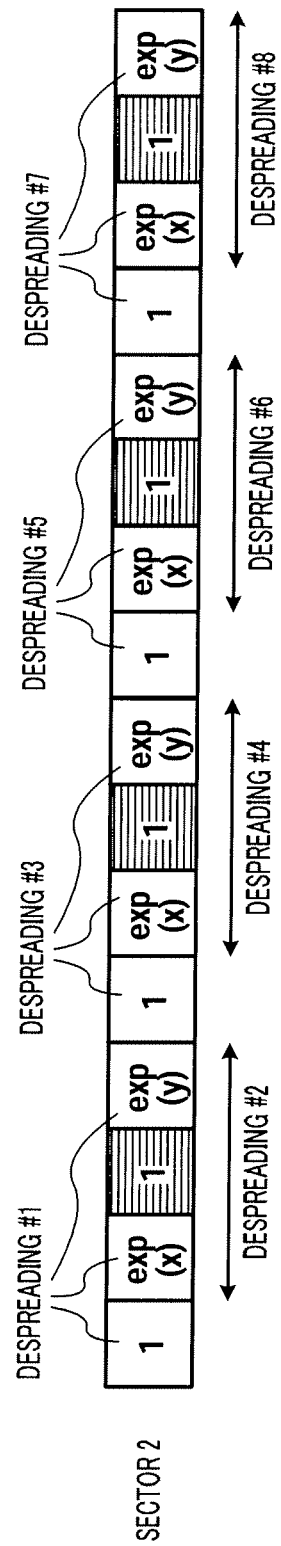
FIG. 17 illustrates an example of despreading according to Embodiment 2 of the present invention (variation 3)

Further, for example, when mobile station 500 is located in sector 2 and base station 100 (FIG. 1) transmits the pilot sequences shown in FIG. 9, as shown in FIG. 17, despreading section 501 performs despreading #1 for orthogonal sequence unit 1 "1, exp(x), exp(y)" not including the common pilot, and performs despreading #2 for orthogonal sequence unit 2 "exp(x), 1, exp(y)" including the common pilot. Despreading #3 to #8 are performed in the same way as above.

Thus, despreading section 501 acquires the despreading values of orthogonal sequence units 1 and orthogonal sequence units 2.

Combining section 502 combines the despreading values of orthogonal sequence units 1 and the despreading values of orthogonal sequence units 2, and outputs the combined values to channel estimating section 503. That is, combining section 502 combines the despreading value acquired in despreading #1 and the despreading value acquired in despreading #2, the despreading value acquired in despreading #3 and the despreading value acquired in despreading #4, the despreading value acquired in despreading #5 and the despreading value acquired in despreading #6, and the despreading value acquired in despreading #7 and the despreading value acquired in despreading #8.

Channel estimating section 503 calculates the channel estimation value using the combined values acquired in combining section 502 and outputs the channel estimation value to correcting section 305.

Thus, according to the present embodiment, the channel estimation value for unicast data can be acquired using orthogonal sequence units 2 including common pilots in addition to orthogonal sequence units 1 not including the common pilots, so that it is possible to improve channel estimation accuracy for unicast data.

(Embodiment 3)

As described above, base station 100 can map common pilots on certain positions of orthogonal sequence units.

Therefore, pilot generating section 105 of base station 100 according to the present embodiment generates a pilot sequence on which a plurality of common pilots are consecutively mapped. Here, pilot generating section 105 of the present embodiment has the same configuration as in FIG. 3, and, consequently, will be explained repeatedly using FIG. 3.

Figure 18:
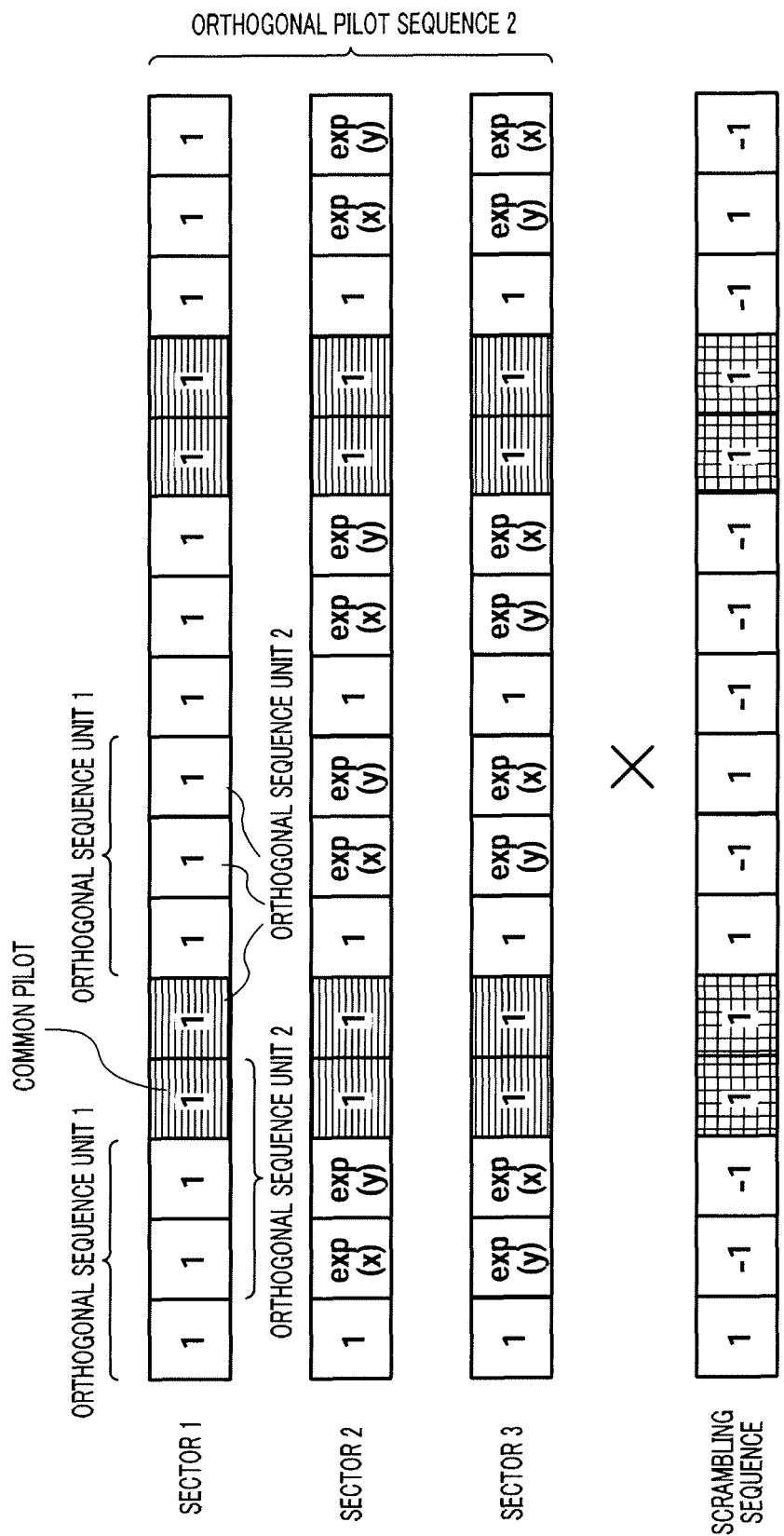
FIG. 18 illustrates orthogonal pilot sequence 2 and a scrambling sequence according to Embodiment 3 of the present invention.

As shown in FIG. 18, inserting section 1051 generates orthogonal pilot sequences 2 by inserting common pilots into orthogonal pilot sequences 1 (FIG. 4). To be more specific, inserting section 1051 generates orthogonal pilot sequences 2 by inserting common pilots into each of a plurality of orthogonal sequence units forming orthogonal pilot sequences 1. In this case, as shown in FIG. 18, inserting section 1051 inserts two consecutive common pilots between adjacent orthogonal units 1.

By the way, as shown in FIG. 18, according to the insertion processing in inserting section 1051, inserting section 1052 generates a scrambling sequence by inserting the common sequence "1, 1, 1, 1" into the unique scrambling sequence shown in FIG. 4.

As shown in FIG. 18, scrambling section 1053 performs scrambling processing of multiplying orthogonal pilot sequences 2 by the scrambling sequence. With this scrambling processing, as shown in FIG. 19, in each sector 1 to 3, as in Embodiment 1, it is possible to generate pilot sequences including pilots that are common between a plurality of cells in part of the pilot sequences that differ between the plurality of cells.

Thus, pilot generating section 105 according to the present embodiment maps a plurality of consecutive common pilots on the pilot sequence.

Figure 19:
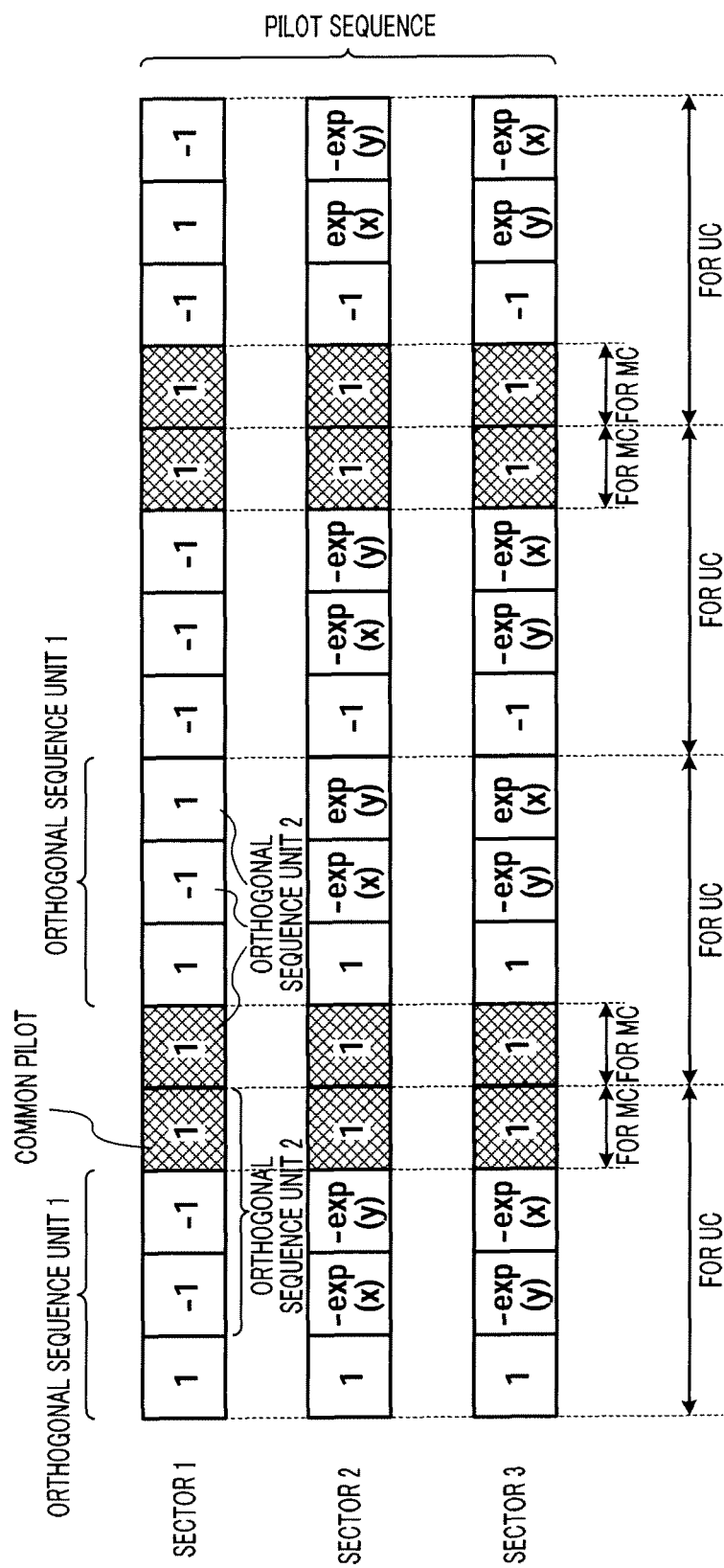
FIG. 19 illustrates a pilot sequence according to Embodiment 3 of the present invention.

By the way, in mobile station 200 (FIG. 10) for receiving multicast data that receives the pilot sequences shown in FIG. 19, before channel estimating section 210 calculates the channel estimation value using the common pilots selected in pilot selecting section 209, channel estimating section 210 calculates the average value of adjacent common pilots and calculates the channel estimation value from the average value. The averaging common pilots are mapped on adjacent subcarriers in the frequency domain, so that the channel fluctuations of these common pilots can be processed as the same. Therefore, by calculating the average value of adjacent common pilots and calculating a channel estimation value from the average value, the SNIR is improved by the averaging effect, so that it is possible to improve channel estimation accuracy for multicast data.

(Embodiment 4)

In above Embodiments 1 and 3, as shown in FIGS. 5 and 18, to generate a pilot sequence, inserting section 1052 generates a scrambling sequence by inserting the common sequence "1, 1, 1, 1" into the unique scrambling sequence shown in FIG. 4, according to the insertion processing in inserting section 1051.

However, the scrambling sequence generated as above differs from the original unique scrambling sequence, and, consequently, is not always the optimum scrambling sequence. As a result, in above Embodiments 1 and 3, the randomizing effect of the scrambling sequences shown in above Embodiments 1 and 3 is reduced, thereby causing interference between cells.

Therefore, pilot generating section 105 of base station 100 according to the present invention generates a pilot sequence as follows.

Figure 20:
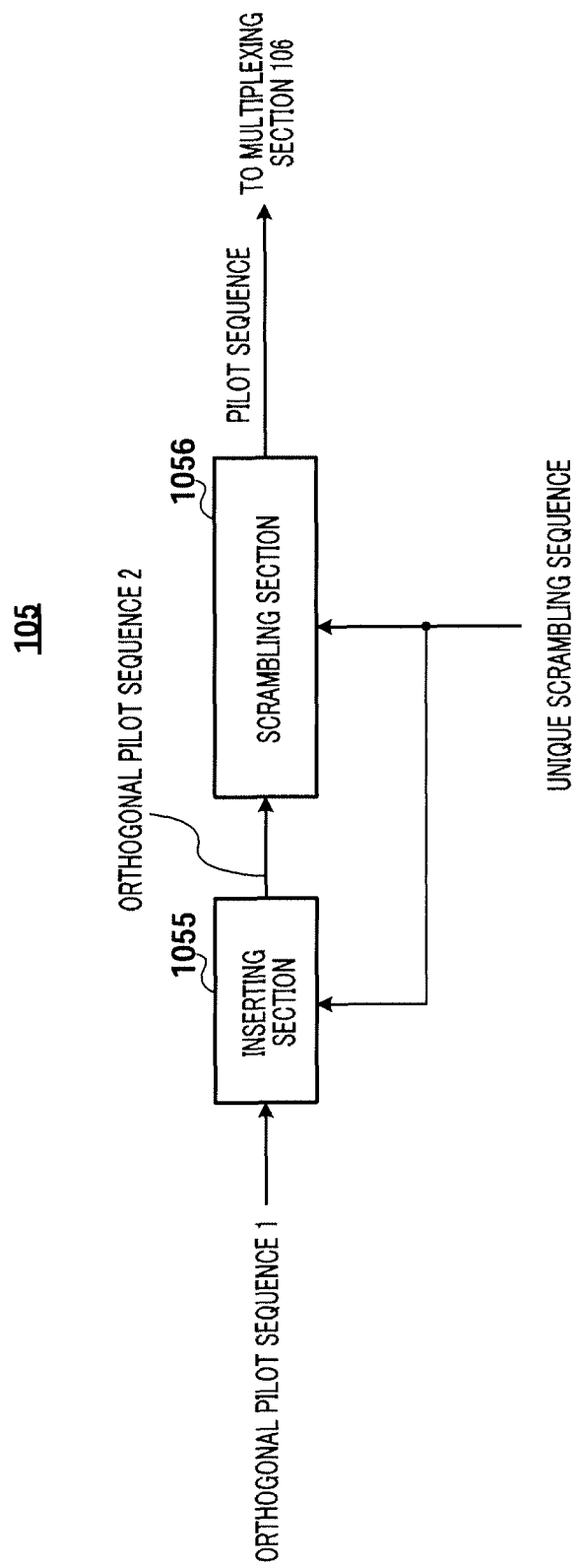
FIG. 20 is a block diagram showing a configuration of a pilot generating section according to Embodiment 4 of the present invention.

FIG. 20 illustrates the configuration of pilot generating section 105 according to the present embodiment.

Orthogonal pilot sequences 1 shown in FIG. 4 are inputted to inserting section 1055. Further, the unique scrambling sequence shown in FIG. 4 is inputted to inserting section 1055.

Figure 21:
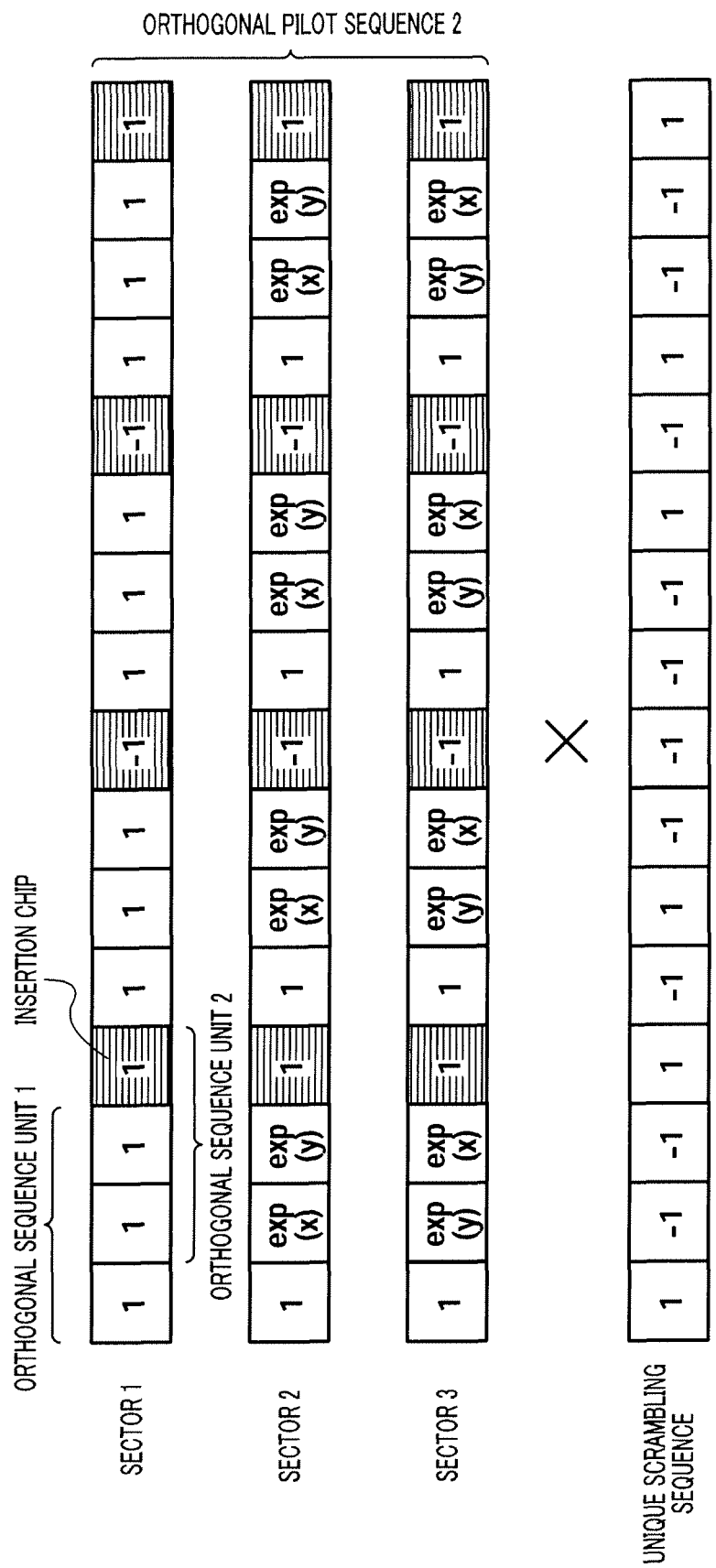
FIG. 21 illustrates orthogonal pilot sequence 2 and a unique scrambling sequence according to Embodiment 4 of the present invention.

As shown in FIG. 21, inserting section 1055 generates orthogonal pilot sequences 2 by inserting chips matching with the unique scrambling sequence into orthogonal pilot sequences (FIG. 4). To be more specific, inserting section 1055 generates orthogonal pilot sequences 2 by inserting the same chips as the ones of the unique scrambling sequence into a plurality of orthogonal sequence units forming orthogonal pilot sequences 1. For example, in FIG. 21, the fourth chip, eighth chip, twelfth chip and sixteenth chip in the unique scrambling sequence are "1," "−1," "−1" and "1," respectively. Consequently, inserting section 1055 generates orthogonal pilot sequences 2 by inserting chips "1," "−1," "−1" and "1" into orthogonal pilot sequences 1.

As shown in FIG. 21, scrambling section 1056 performs scrambling processing of multiplying orthogonal pilot sequences 2 by the unique scrambling sequence. With this scrambling processing, as in Embodiment 1, it is possible to generate the pilot sequences shown in FIG. 6.

Thus, pilot generating section 105 according to the present embodiment generates pilot sequences suitable for both unicast data and multicast data.

As described above, according to the present embodiment, to generate the pilot sequences shown in FIG. 6, the original unique scrambling sequence is directly used, so that it is possible to maintain optimum scrambling sequences in addition to the advantage of Embodiments 1 and 3, thereby preventing reduction of the randomizing effect of scrambling sequences and preventing interference between cells.

Further, in the present embodiment, as in Embodiment 1, it is possible to map the multicast data pilots on subcarriers of the same frequencies as the subcarriers to which multicast data symbols are mapped.

Further, in the present embodiment, it is possible to map the common pilots on certain positions in orthogonal sequence units. Therefore, as in Embodiment 3, pilot generating section 105 of the present embodiment may generate the pilot sequences on which a plurality of consecutive common pilots are mapped as follows.

Figure 22:
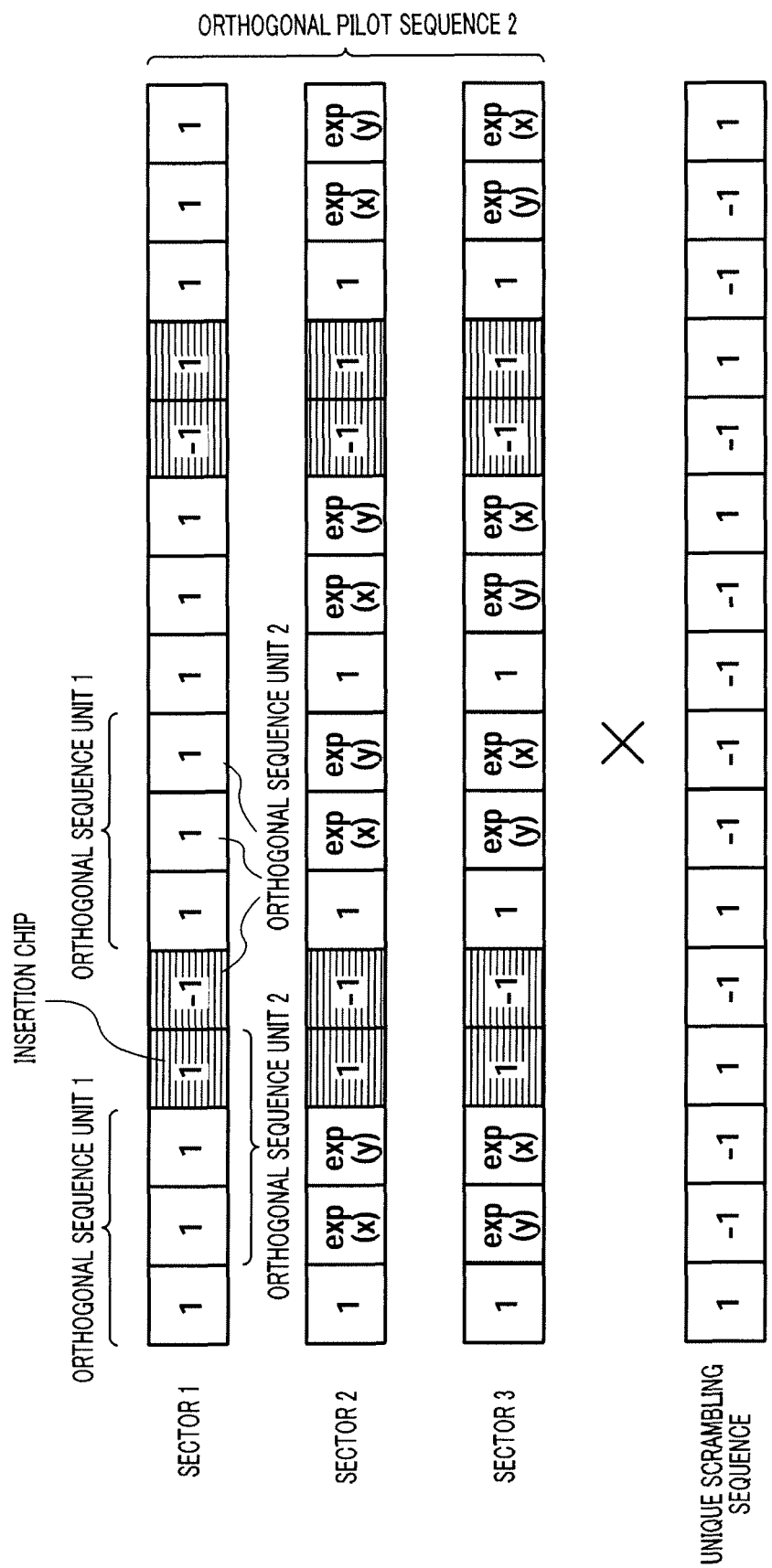
FIG. 22 illustrates orthogonal pilot sequence 2 and a unique scrambling sequence according to Embodiment 4 of the present invention.

To insert chips matching with the unique scrambling sequence into orthogonal pilot sequence 1 (FIG. 4), as shown in FIG. 22, inserting section 1055 shown in FIG. 20 inserts two consecutive chips matching with the unique scrambling sequence into adjacent orthogonal sequence units 1. For example, in FIG. 22, the fourth chip, fifth chip, twelfth chip and thirteenth chip are "1," "−1," "−1" and "1," respectively. According to this processing, inserting section 1055 generates orthogonal pilot sequence 2 by consecutively inserting chips "1" and "−1," and "−1" and "1" into orthogonal pilot sequence 1.

As shown in FIG. 22, scrambling section 1056 performs scrambling processing of multiplying orthogonal pilot sequences 2 by the unique scrambling sequence. With this scrambling processing, as in Embodiment 3, it is possible to generate the pilot sequences shown in FIG. 19.

Next, a mobile station that receives an OFDM symbol which is comprised of the pilot sequences and generated as above and an OFDM symbol generated as above where unicast data symbols and multicast data symbols are frequency-domain-multiplexed.

According to the present embodiment, as in Embodiments 1 to 3, descrambling sections 208 of above mobile stations 200, 300, 400 and 500 perform descrambling processing of multiplying the pilot sequences by the scrambling sequence.

Here, as in Embodiments 1 to 3, the multiplied scrambling sequence is generated by inserting the common sequence "1, 1, 1, 1" into the unique scrambling sequence.

As described above, according to the present embodiment, for a base station that uses the original unique scrambling sequence as it is to generate pilot sequences, it is possible to provide a mobile station that acquires the same effects as in Embodiments 1 to 3.

The embodiments of the present invention have been explained above.

Here, although an embodiment has been described with the above explanations where a common pilot sequence is inserted into each orthogonal sequence unit, two or more common pilots can be inserted into each orthogonal sequence unit.

Further, by replacing the above-described "multicast" by "broadcast," it is possible to implement the present invention in the same way as above in a radio communication system where broadcast data and unicast data are frequency-domain-multiplexed.

Further, CP may be referred to as "GI," which means a guard interval. Further, a subcarrier may be referred to as a "tone." Further, a base station and a mobile station may be referred to as "Node B" and "UE," respectively.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2006-011555, filed on Jan. 19, 2006, and Japanese Patent Application No. 2006-080503, filed on Mar. 23, 2006, including the specification, drawings and abstract, are incorporated herein by reference in its entirety.

Industrial Applicability

The present invention is applicable to, for example, mobile communication systems.

The invention claimed is:

1. A radio communication base station apparatus that transmits a multicarrier signal where first data that differs between a plurality of cells and second data that is the same the plurality of cells are multiplexed in a frequency domain, the apparatus comprising:
a generator configured to generate a first pilot sequence that differs between the plurality of cells and that includes a second pilot that is common between the plurality of cells in part of the first pilot sequence; and
a multiplexer configured to multiplex the first pilot sequence and the multicarrier signal in a time domain,
wherein the generator generates the first pilot sequence by multiplying a second pilot sequence including an orthogonal pilot sequence that differs between a plurality of sectors forming a cell and a pilot that is common between the plurality of cells, by a scrambling sequence including a first sequence that differs between the plurality of cells and a second sequence that is common between the plurality of cells.

2. The radio communication base station apparatus according to claim 1, wherein the first data comprises unicast data and the second data comprises multicast data.

3. The radio communication base station apparatus according to claim 1, wherein the generator maps the second pilot on subcarriers of the same frequency as subcarriers on which the second data is mapped, among a plurality of subcarriers forming the multicarrier signal.

4. The radio communication base station apparatus according to claim 1, wherein the generator maps the second pilots at regular intervals on the first pilot sequence.

5. The radio communication base station apparatus according to claim 1, wherein the generator maps consecutive second pilots on the first pilot sequence.

6. The radio communication base station apparatus according to claim 1, wherein the generator generates the second pilot sequence by inserting the common pilot into the orthogonal pilot sequence.

7. The radio communication base station apparatus according to claim 6, wherein:
the orthogonal pilot sequence is comprised of a plurality of same orthogonal sequence units; and
the generator generates the second pilot sequence by inserting the common pilot into the orthogonal sequence units.

8. The radio communication base station apparatus according to claim 1, the generator generates the scrambling sequence by inserting the second sequence into the first sequence.

9. A radio communication base station apparatus that transmits a multicarrier signal where first data that differs between a plurality of cells and second data that is the same between the plurality of cells are multiplexed in a frequency domain, the apparatus comprising:
a generator configured to generate a first pilot sequence that differs between the plurality of cells and that includes a second pilot that is common between the plurality of cells in part of the first pilot sequence; and
a multiplexer configured to multiplex the first pilot sequence and the multicarrier signal in a time domain,
wherein the generator generates a scrambling sequence by inserting chips of a common sequence that is common between the plurality of cells into an orthogonal pilot sequence that differs between a plurality of sectors forming one of the plurality of cells, and generates the first pilot sequence by multiplying a second pilot sequence by the scrambling sequence.

10. The radio communication base station apparatus according to claim 9, wherein:
the orthogonal pilot sequence is comprised of a plurality of same orthogonal sequence units; and
the generator generates the second pilot sequence by inserting the chips into the orthogonal sequence units.

11. A radio communication mobile station apparatus that receives a first pilot sequence and a multicarrier signal transmitted from a radio communication base station apparatus, the radio communication mobile station apparatus comprising:
a despreader configured to despread the first pilot sequence generated by (i) inserting chips of a common pilot that is common between a plurality of cells into orthogonal pilot sequences that differ between a plurality of sectors forming one of the plurality of cells, on a per orthogonal sequence unit basis to provide a second pilot sequence, and (ii) multiplying the second pilot sequence by a scrambling sequence, to acquire a plurality of despreading values;

a combiner configured to combine the plurality of despreading values to acquire a combined value;

an estimator configured to estimate a channel estimation using the combined value to acquire a channel estimation value; and a corrector configured to correct channel fluctuation of the first data using the channel estimation value.

12. A pilot transmission method in a radio communication base station apparatus that transmits a multicarrier signal where first data that differs between a plurality of cells and second data that is the same between the plurality of cells are multiplexed in a frequency domain, the method comprising:

generating a first pilot sequence by multiplying a second pilot sequence including an orthogonal pilot sequence that differs between a plurality of sectors forming a cell and a pilot that is common between the plurality of cells, by a scrambling sequence including a first sequence that differs between the plurality of cells and a second sequence that is common between the plurality of cells; and transmitting the first pilot sequence that differs between the plurality of cells and that includes the second pilot that is common between the plurality of cells in part of the first pilot sequence.

* * * * *

UNITED STATES PATENT AND TRADEMARK OFFICE
CERTIFICATE OF CORRECTION

PATENT NO. : 8,416,810 B2  
APPLICATION NO. : 12/160872  
DATED : April 9, 2013  
INVENTOR(S) : Isamu Yoshii et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this
Sixth Day of May, 2014

Michelle K. Lee
*Deputy Director of the United States Patent and Trademark Office*